(12) United States Patent
Ko et al.

(10) Patent No.: US 11,210,050 B2
(45) Date of Patent: Dec. 28, 2021

(54) DISPLAY CONTROL METHOD, STORAGE MEDIUM AND ELECTRONIC DEVICE

(71) Applicant: SAMSUNG ELECTRONICS CO., LTD., Suwon-si (KR)

(72) Inventors: Jeong-Won Ko, Seoul (KR); Mun-Hwi Kim, Suwon-si (KR); Joon-Hwan Kim, Yongin-si (KR); Hye-Jin Kim, Seoul (KR); Kyung-Wook Ro, Seoul (KR); Myoung-Soo Park, Hwaseong-si (KR); Jung-Woo Shin, Uiwang-si (KR); Ji-Hun Lee, Seoul (KR); Han-Ju Cho, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/482,070

(22) PCT Filed: Jan. 29, 2018

(86) PCT No.: PCT/KR2018/001226
§ 371 (c)(1),
(2) Date: Jul. 30, 2019

(87) PCT Pub. No.: WO2018/143624
PCT Pub. Date: Aug. 9, 2018

(65) Prior Publication Data
US 2020/0249898 A1   Aug. 6, 2020

(30) Foreign Application Priority Data

Jan. 31, 2017 (KR) .................. 10-2017-0014084

(51) Int. Cl.
*G06F 1/16* (2006.01)
*G06F 3/14* (2006.01)
(Continued)

(52) U.S. Cl.
CPC .......... *G06F 3/1446* (2013.01); *G06F 1/1652* (2013.01); *G06F 3/04886* (2013.01);
(Continued)

(58) Field of Classification Search
CPC ................ G06F 1/1652; G06F 2203/04102
See application file for complete search history.

(56) References Cited

U.S. PATENT DOCUMENTS 9,104,886 B1 * 8/2015 Dolbakian ............. G06F 21/62
2010/0064244 A1   3/2010 Kilpatrick, II et al.
(Continued)

FOREIGN PATENT DOCUMENTS

KR   10-2014-0141042   12/2014
KR   10-2015-0125554   11/2015
(Continued)

OTHER PUBLICATIONS

International Search Report for PCT/KR2018/001226 dated May 8, 2018, 8 pages.
(Continued)

*Primary Examiner* — Roy P Rabindranath
(74) *Attorney, Agent, or Firm* — Nixon & Vanderhye, P.C.

(57) ABSTRACT

According to various example embodiments, an electronic device may include: a flexible display; and a processor for control the flexible display to divide a display area into a plurality of areas including a first area and a second area, in response to detecting of notification event in a folded state, processing the notification event in a first manner using at least one of the first area and the second area when the electronic device is in a first mounted state, and processing the notification event in a second manner using at least one of the first area and the second area when the electronic device is in a second mounted state.

9 Claims, 23 Drawing Sheets

(51) Int. Cl.
    *G06F 3/0488* (2013.01)
    *G09F 9/30* (2006.01)
    *G09G 3/20* (2006.01)

(52) U.S. Cl.
    CPC .............. *G09F 9/301* (2013.01); *G09G 3/20* (2013.01); *G09G 2354/00* (2013.01); *G09G 2356/00* (2013.01); *G09G 2360/04* (2013.01); *G09G 2380/02* (2013.01)

(56) References Cited

U.S. PATENT DOCUMENTS

| | | | |
|---|---|---|---|
| 2015/0042570 A1* | 2/2015 | Lombardi | G06F 3/0488 345/173 |
| 2016/0192134 A1 | 6/2016 | Kwak et al. | |
| 2016/0246559 A1 | 8/2016 | Jung | |
| 2016/0372083 A1* | 12/2016 | Taite | G06F 3/017 |
| 2017/0045996 A1 | 2/2017 | Ka et al. | |
| 2017/0052566 A1* | 2/2017 | Ka | G06F 1/1694 |

FOREIGN PATENT DOCUMENTS

| | | |
|---|---|---|
| KR | 10-2016-0077856 | 7/2016 |
| KR | 10-2016-0092776 | 8/2016 |
| KR | 10-2016-0103599 | 9/2016 |

OTHER PUBLICATIONS

Written Opinion of the ISA for PCT/KR2018/001226 dated May 8, 2018, 7 pages.

* cited by examiner

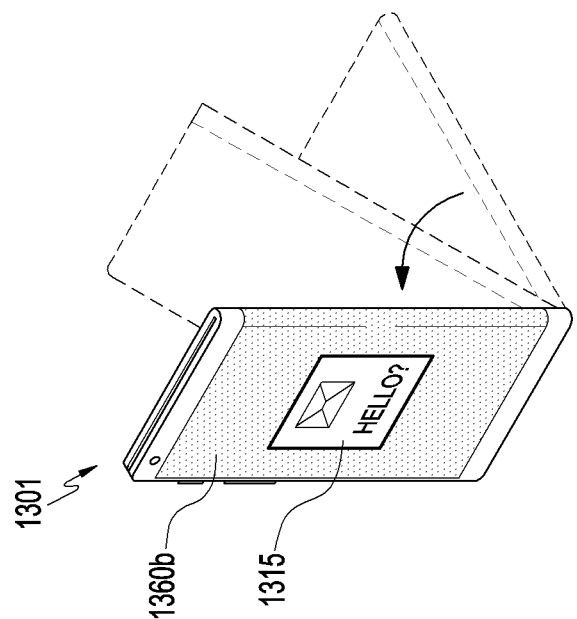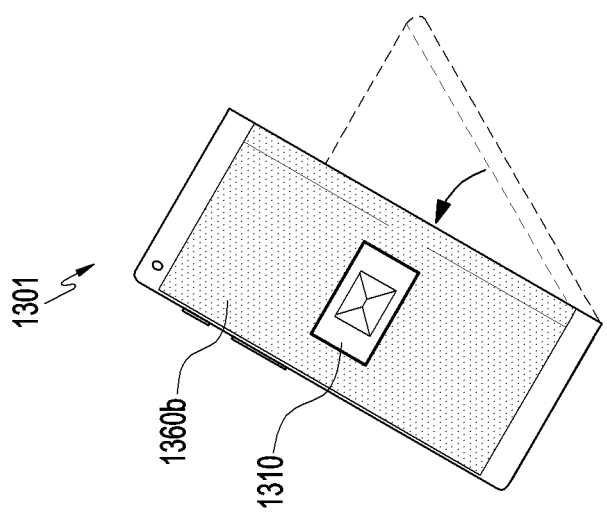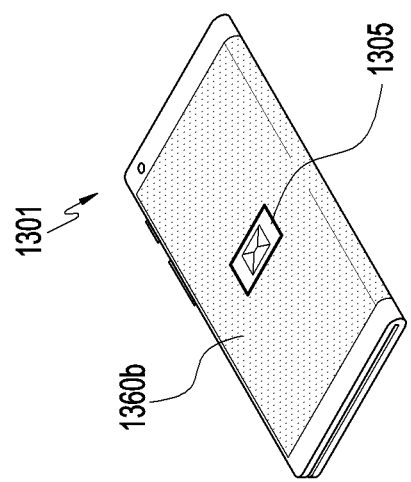

DISPLAY CONTROL METHOD, STORAGE MEDIUM AND ELECTRONIC DEVICE

CROSS-REFERENCE TO RELATED APPLICATION(S)

This application is a National Phase Entry of PCT International Application No. PCT/KR2018/001226, which was filed on Jan. 29, 2018 and claims priority under 35 U.S.C. § 119 of Korean Patent Application No. 10-2017-0014084, filed on Jan. 31, 2017, in the Korean Intellectual Property Office the disclosure of which is incorporated herein by reference in its entirety.

BACKGROUND

1. Field

The disclosure generally relates to a flexible electronic device and a method of controlling a display.

2. Description of Related Art

With continuing progress in electronic technology, flexible electronic devices of various types have been developed. Particularly, electronic devices, such as a television (TV), a Personal Computer (PC), a laptop computer, a tablet PC, a mobile phone, an MPEG-1 audio layer-3 (MP3) player, and the like, have a sufficient high market penetration as to be nearly ubiquitous in most homes.

In order to meet the needs of users who desire newer and more various functions, efforts have been made to develop electronic devices in newer forms.

A flexible electronic device may refer to an electronic device in which the form or shape of the device can be altered, similar to the manner in which paper is alterable. The flexible electronic device may be deformed or otherwise altered by force applied by a user, taking on a format of being folded.

SUMMARY

A method of effectively providing information required by a user using a characteristic of a folding-type flexible electronic device is required.

Further, a method of providing various user interfaces by reflecting a user's intention for an oriented state of the folding-type flexible electronic device is required.

In addition, a method by which the user easily selects whether to output a notification event in the folding-type flexible electronic device is required.

In accordance with an aspect of the disclosure, an electronic device is provided. The electronic device includes: a flexible display; and a processor configured to, control the flexible display to display to divide a display area into a plurality of areas including a first area and a second area, in response to detecting of a notification event, process the notification event in a first type using at least one of the first area and the second area when the electronic device is in a first oriented state and process the notification event in a second type using at least one of the first area and the second area when the electronic device is in a second oriented state.

In accordance with another aspect of the disclosure, a method of controlling a display by an electronic device is provided. The method includes: controlling, by a processor, a flexible display to divide a display area into a plurality of areas including a first area and a second area; detecting a notification event in a folded state; in response to the detecting of the notification event, processing a notification event in a first type using at least one of the first area and the second area when the electronic device is in a first oriented state; and processing the notification event in a second type using at least one of the first area and the second area when the electronic device is in a second oriented state.

In accordance with another aspect of the disclosure, a storage medium storing instructions is provided. The instructions are configured to cause at least one processor to, when executed by the at least one processor, perform at least one operation. The at least one operation includes: controlling, by a processor, a flexible display to divide a display area into a plurality of areas including a first area and a second area; detecting a notification event in a folded state; in response to the detecting of the notification event, processing a notification event in a first type using at least one of the first area and the second area when the electronic device is in a first oriented state; and processing the notification event in a second type using at least one of the first area and the second area when the electronic device is in a second oriented state.

According to various embodiments, a folding-type flexible electronic device can efficiently control an output type of content displayed on a display screen through a simple user interface.

According to various embodiments, a notification event output type suitable for user context can be provided according to an oriented state of the flexible electronic device.

According to various embodiments, a notification event output type can be variously set according to an oriented state of the flexible electronic device in a folded state, and accordingly user convenience can be improved.

BRIEF DESCRIPTION OF THE DRAWINGS

FIGS. 13A, 13B, and 13C illustrate screens for displaying event information corresponding to tilting angles of the electronic device according to various embodiments.

DETAILED DESCRIPTION OF THE DISCLOSURE

Figure 1A:
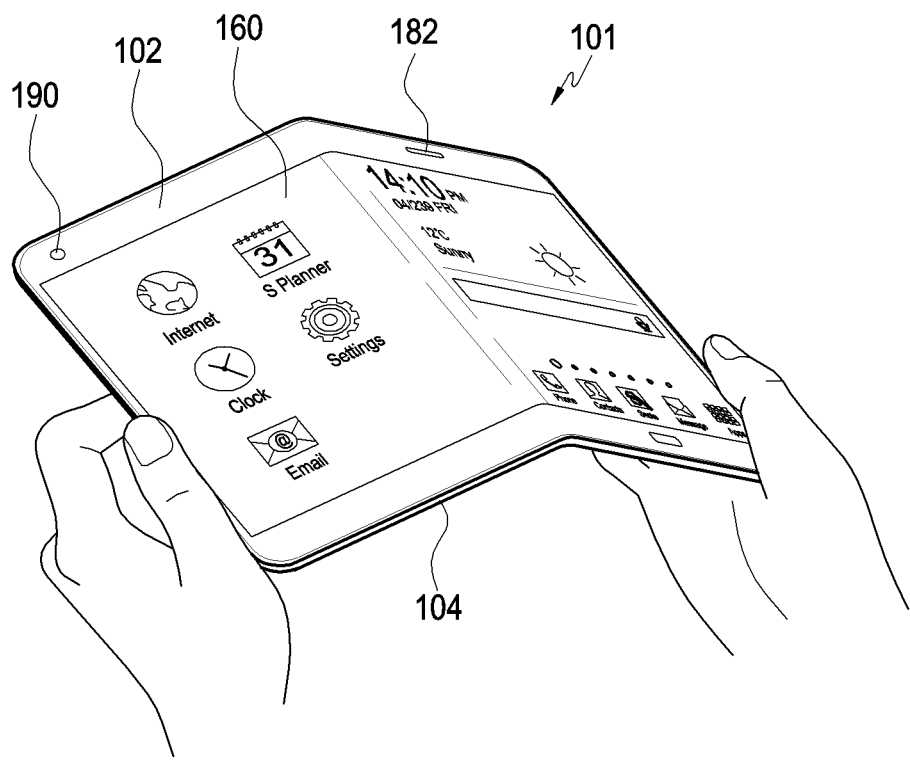
FIGS. 1A, 1B, and 1C illustrate an electronic device according to various embodiments.

Hereinafter, various embodiments of the disclosure will be described with reference to the accompanying drawings. It should be understood that the embodiments and the terms used herein are not intended to limit the disclosure to the particular forms disclosed and the disclosure is to cover various modifications, equivalents, and/or alternatives of the corresponding embodiments. In describing the drawings, similar reference numerals may be used to designate similar elements. As used herein, the singular forms may include the plural forms as well, unless the context clearly indicates otherwise. In the disclosure, the expression "A or B", "A/B", or "at least one of A and/or B" may include all possible combinations of the items listed. The expression "a first", "a second", "the first", or "the second" may modify corresponding elements regardless of the order or the importance, and is used only to distinguish one element from another element, but does not limit the corresponding elements. When an element (e.g., first element) is referred to as being (operatively or communicatively) "connected," or "coupled," to another element (e.g., second element), it may be directly connected or coupled directly to the other element or any other element (e.g., third element) may be interposed between them.

In the disclosure, the expression "configured to" may be exchanged with, for example, "suitable for", "having the capacity to", "adapted to", "made to", "capable of", or "designed to" in terms of hardware or software, according to circumstances. In some situations, the expression "device configured to" may mean that the device, together with other devices or components, "is able to". For example, the phrase "processor adapted (or configured) to perform A, B, and C" may mean a dedicated processor (e.g. embedded processor) for performing the corresponding operations or a general-purpose processor (e.g., Central Processing Unit (CPU) or Application Processor (AP)) that can perform the corresponding operations by executing one or more software programs stored in a memory device.

An electronic device according to various embodiments of the disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), an MPEG-1 audio layer-3 (MP3) player, a medical device, a camera, and a wearable device. According to various embodiments of the disclosure, the wearable device may include at least one of an accessory type (e.g., a watch, a ring, a bracelet, an anklet, a necklace, glasses, a contact lens, or a Head-Mounted Device (HMD)), a fabric- or clothing-integrated type (e.g., an electronic clothing), a body-mounted type (e.g., a skin pad or tattoo), and a bio-implantable type (e.g., an implantable circuit). According to some embodiments of the disclosure, the electronic device may include at least one of, for example, a television, a Digital Video Disk (DVD) player, an audio player, a refrigerator, an air conditioner, a vacuum cleaner, an oven, a microwave oven, a washing machine, an air cleaner, a set-top box, a home automation control panel, a security control panel, a media box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment of the disclosure, the electronic device may include at least one of various medical devices (e.g., various portable medical measuring devices (a blood glucose monitoring device, a heart rate monitoring device, a blood pressure measuring device, a body temperature measuring device, and/or the like), a Magnetic Resonance Angiography (MRA), a Magnetic Resonance Imaging (MRI), a Computed Tomography (CT) machine, and an ultrasonic machine), a navigation device, a Global Navigation Satellite System (GNSS), an Event Data Recorder (EDR), a Flight Data Recorder (FDR), a vehicle infotainment device, electronic devices for a ship (e.g., a navigation device for a ship, a gyro-compass, and/or the like), avionics, security devices, an automotive head unit, a robot for home or industry, a drone, an Automatic Teller's Machine (ATM) in banks, Point Of Sales (POS) in a shop, and an Internet of Things device (e.g., a light bulb, various sensors, a sprinkler device, a fire alarm, a thermostat, a streetlamp, a toaster, sporting goods, a hot water tank, a heater, a boiler, and/or the like). According to some embodiments of the disclosure, the electronic device may include at least one of a part of a piece of furniture, a building/structure, or a motor vehicle, an electronic board, an electronic signature receiving device, a projector, and various kinds of measuring instruments (e.g., a water meter, an electric meter, a gas meter, a radio wave meter, and/or the like). In various embodiments of the disclosure, the electronic device may be flexible, or may be a combination of two or more of the aforementioned various devices. The electronic device according to an embodiment of the disclosure is not limited to the aforementioned devices. In the disclosure, the term "user" may indicate a person using an electronic device or a device (e.g. an artificial intelligence electronic device) using an electronic device.

In various embodiments of the disclosure below, "folding interaction" is a folding operation or an unfolding operation reflecting the user's intention when the user holds a flexible electronic device. For example, the folding interaction may include an operation of folding a flexible electronic device by applying force with a user's one hand, an operation of folding the flexible electronic device by applying force with a user's both hands, and an operation of unfolding the folded flexible electronic device, but various embodiments of the disclosure are not limited thereto.

Figure 1B:
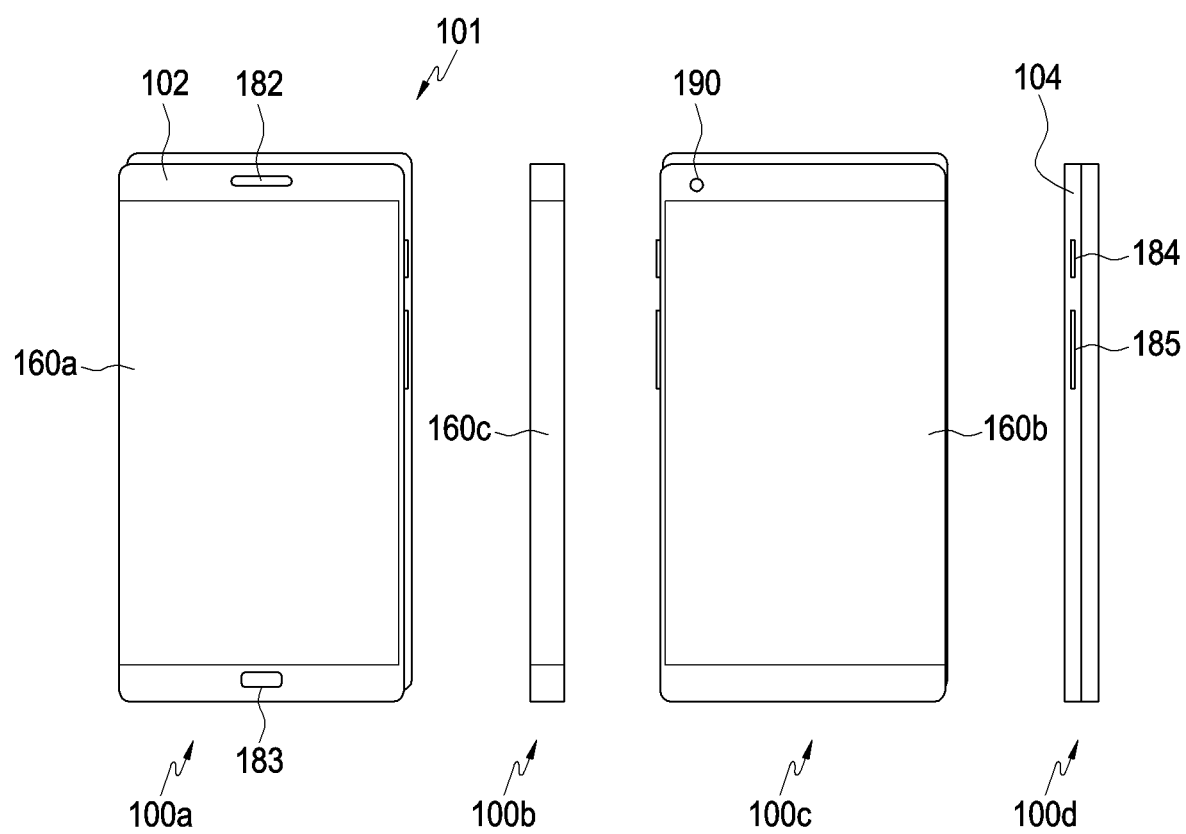
Figure 1C:
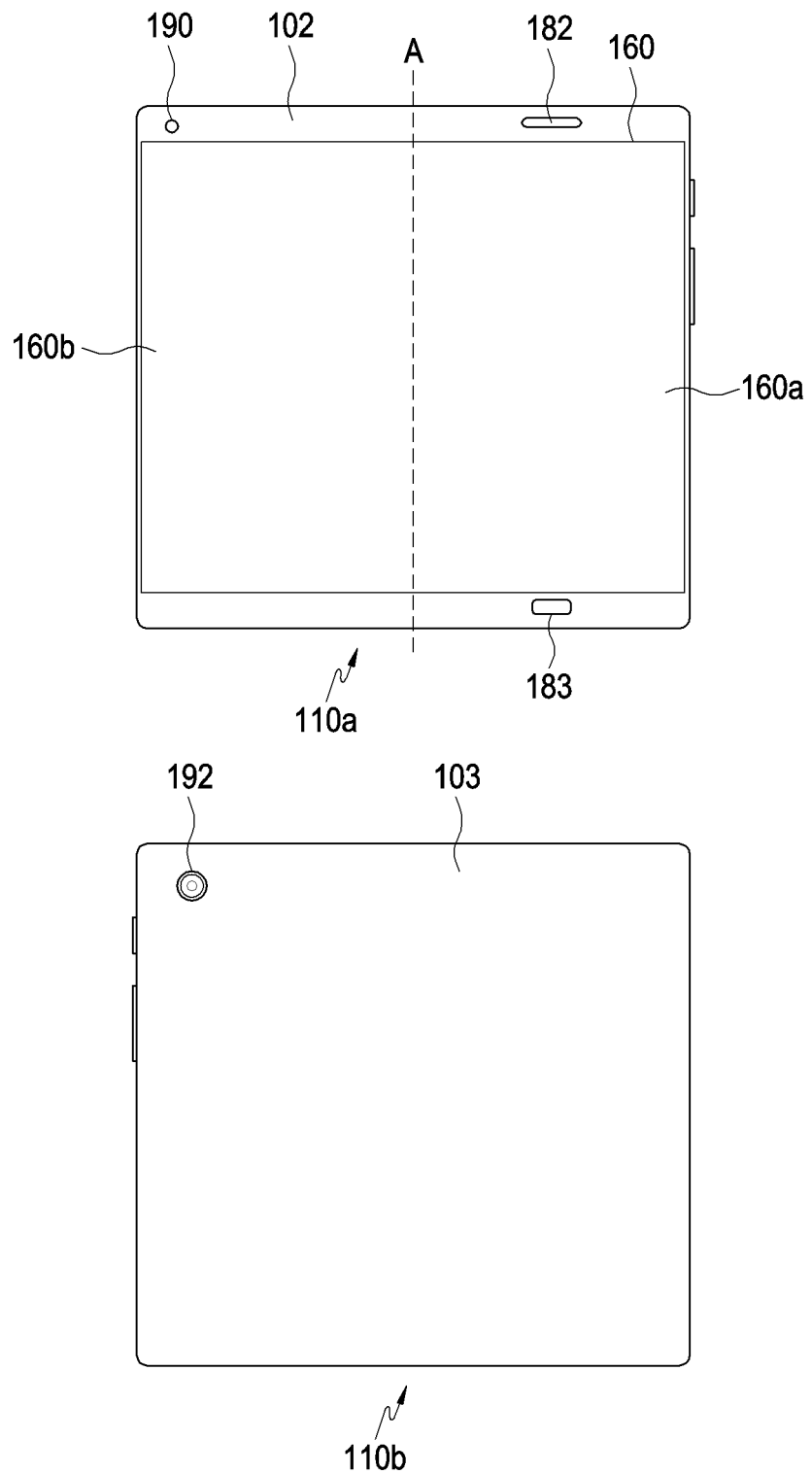

FIGS. 1A to 1C illustrate an electronic device according to various embodiments.

FIG. 1A illustrates a state in which the electronic device is bent, FIG. 1B illustrates a state in which the electronic device is folded, and FIG. 1C illustrates a font surface and a back surface of the unfolded electronic device. FIGS. 1A to 1C illustrate a flexible electronic device 101.

As illustrated in FIG. 1A, a flexible display 160 may be disposed on a front surface 102 of the electronic device 101 and the flexible display may have a foldable (bendable) characteristic. The display 160 may be formed to be large in order to occupy most parts of the front surface 102 of the electronic device 101. For example, a main home screen may be displayed on the display 160. The main home screen may be an interactive first screen or Graphical User Interface (GUI) which is displayed on the display 160 when the electronic device 101 is turned on. At least one of short-cut icons for executing frequently used applications, a main menu switching key, time, and weather may be displayed on the home screen. When the user selects the main menu switching key, a menu screen may be displayed on the display 160.

A status bar indicating at least one status of the electronic device 101 such as battery charging state, an intensity of a received signal, or the current time may be displayed on the display 160.

As illustrated in 100a of FIG. 1B, in the folded state, the electronic device 101 may include a home button 183, a menu button (not shown), and/or a back button (not shown) formed at the edge of the front surface 102 of the electronic device 101 below the display 160 (referred to as a bezel or a case part on the circumference of the display 160).

The home button may be used to display a main home screen on the display 160. In addition, the home button may be used to display recently used applications or a task manager on the touch screen 160. The menu button may be used to provide a connection menu which may be displayed on the display 160. The connection menu may include at least one of a widget addition menu, a background change menu, a search menu, an editing menu, and an environment setting menu. The back button may be used to display a just previously executed screen of the current screen or terminate the recently used application.

As illustrated in 100a of FIG. 1B, in the folded state, the electronic device 101 may include a speaker 182 formed on the center of the front surface 102 of the electronic device 101 above the display 160. A state in which a first surface 160a of the display 160 of the electronic device 101 in the folded state is shown may be referred to as a front surface/main surface/main state in the folded state as illustrated in 100a of FIG. 1B. For example, when the electronic device 101 is folded in half, based on the folded part as a reference axis, the first surface 160a may be formed on a surface in an outward direction of the body of the electronic device 101 and a second surface 160b may be formed on a surface in a direction opposite the first surface 160a.

As illustrated in 100c of FIG. 1B, in the folded state, the electronic device 101 may include at least one sensor such as a first camera 190 and/or a distance sensor, an illumination sensor, and a proximity sensor formed on the edge of the front surface 102 of the electronic device 101 above the display 160. A state in which the second surface 160b of the display 160 of the electronic device 101 in the folded state is shown may be referred to as a back/sub surface/sub state in the folded state as illustrated in 100c of FIG. 1B.

In the state in which the electronic device 101 is folded such that the display 160 is exposed to the outside, the electronic device 101 may be configured to display a graphic element/interface/information of a preset condition/type (for example, time information, incoming/outgoing message information, status information of the electronic device) on the display 160 (for example, the first surface 160a or the second surface 160b of the display 160). The display 160 may be configured to detect pressure (for example, user tap/knock). For example, when the user knocks (double-knocks/taps) the display 160, the electronic device 101 may be configured to display a graphic element/interface/information on the display 160. The display 160 may be configured to detect fingerprint information.

In 100b of FIG. 1B, a side surface of the electronic device 101 illustrates, the side surface corresponding to an area in which the display 160 is unfolded and then folded to form a curved line by external force in which the display 160 is folded to be exposed to the outside and thus a portion 160c of the display 160 may be shown on the side surface.

As illustrated in 100d of FIG. 1B, at least one of, for example, a power/lock button 184 and a volume button 185 having a volume up button and a volume down button may be disposed on a side surface 104 of the electronic device 101, and at least one of a terrestrial DMB antenna for receiving broadcasts and at least one microphone may also be disposed thereon.

In the electronic device 101 in the unfolded state as illustrated in 110a of FIG. 1C, the display 160 is formed on the front surface of the body of the electronic device 101 but the back display is not formed as illustrated in 110b of FIG. 1C. The display 160 may be folded based on an A axis of the display 160, and the A axis may be a virtual reference axis on which the display 160 is outwardly folded and unfolded and may be located at the center or in one area of the display 160. It has been described that the display 160 is outwardly folded, but the disclosure is not limited thereto and the display 160 may be inwardly folded such that both ends thereof face each other. When the display 160 is folded on the basis of the reference axis, the display 160 exposed to the outside may be divided into a first area 160a and a second area 160b.

As illustrated in 110b of FIG. 1C, at least one sensor of a second camera 192, a flash (not shown), a speaker (not shown), and/or a distance sensor (not shown) may be disposed on the back surface 103 of the electronic device 101 in the unfolded state.

FIGS. 2A to 2D illustrate various folded states of the electronic device according to various embodiments.

Figure 2A:
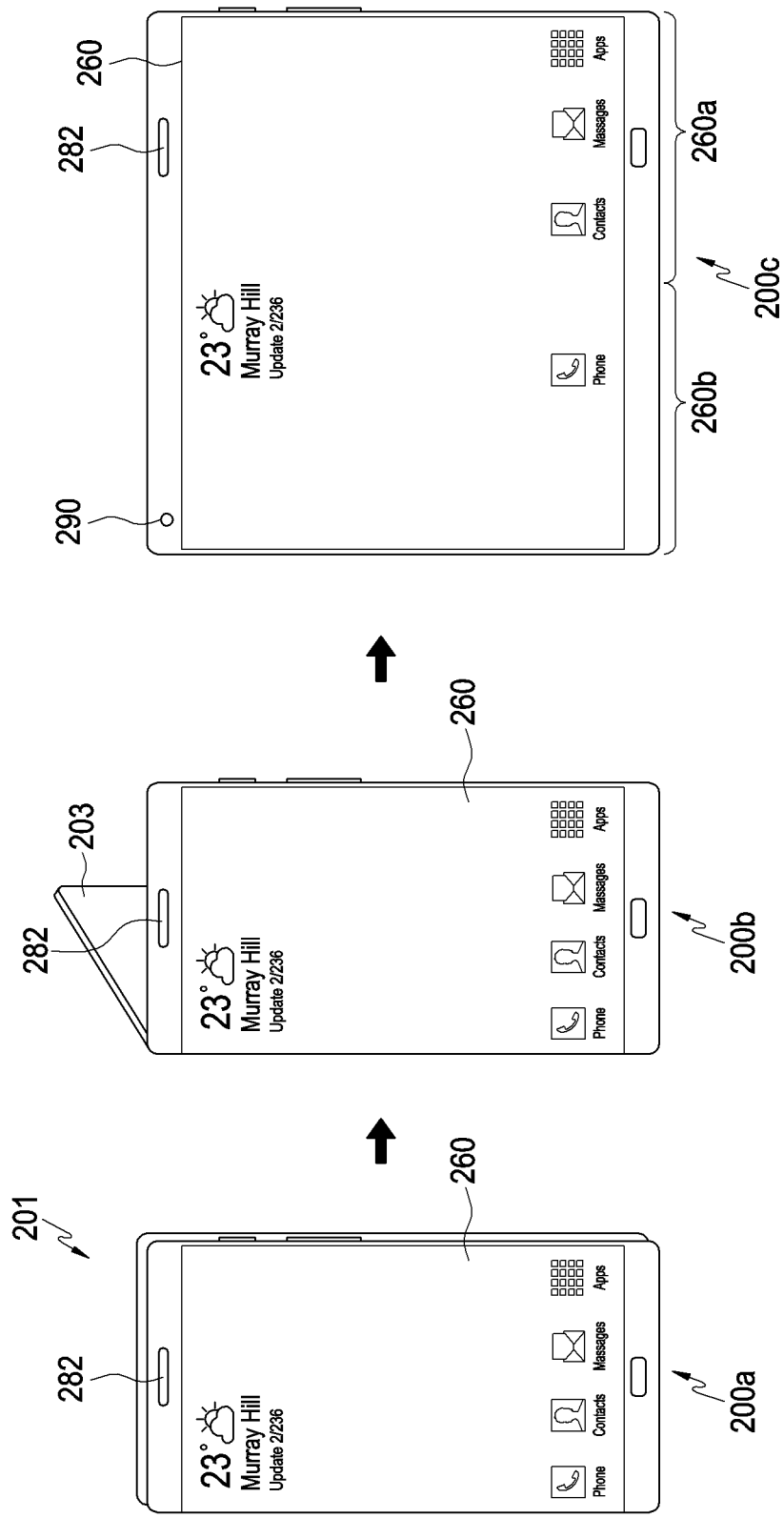
FIGS. 2A, 2B, 2C and 2D illustrate various folded states of the electronic device according to various embodiments.

Referring to 200a of FIG. 2A, when an electronic device 201 is folded (for example, vertical end parts of the electronic device 201 contact each other or are in proximity to each other as close as possible) by external force based on a reference axis of a display 260, the electronic device 201 may display a main home screen and a currently executed application screen in one area of the display 260. When the electronic device 201 in a main state in which the electronic device 201 is folded such that a speaker 282 on an upper part of the front surface is shown is unfolded by external force, a back surface 203 of the electronic device 201 is exposed to the outside as illustrated in 200b of FIG. 2A and an unfolded screen may be displayed on the display 260 as illustrated in 200c of FIG. 2A.

When the electronic device 201 is unfolded, a graphic element/interface/information displayed in one area of the display 260 as illustrated in 200a of FIG. 2A may be rearranged to fit the size of the display 260. For example, when the electronic device 201 is folded, the display 260 may be divided into a first area 260a in which the speaker 282 is located and a second area 260b in which the first camera 290 is located. Further, in the state in which the display 260 is outwardly folded, one used display (for example, the first area 260a or the second area 260b) may be turned on and the other display which is not used (for example, the second area 260b or the first area 260a) may be turned off.

When the display 260 is unfolded, both the first area 260a and the second area 260b may be used according to a specific application or user manipulation, and the area remaining in the on state among the first area 260a and the second area 260b may be changed by user selection.

Figure 2B:
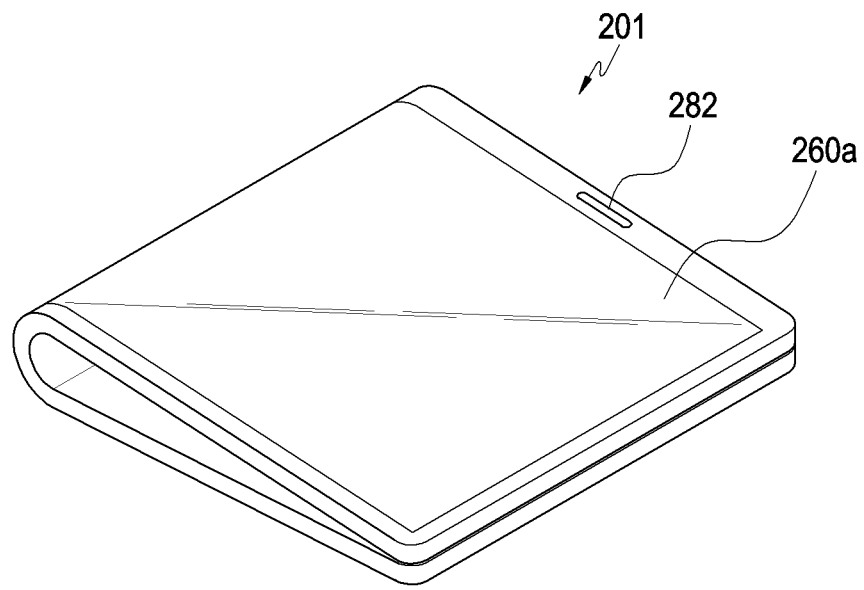

Referring to FIG. 2B, the electronic device 201 may be configured such that back surfaces of vertical end parts are not exposed to the outside. When the electronic device 201 is outwardly folded on the basis of the reference axis, the area 260a of the display 260 may be exposed to the outside. When the speaker 282 is located on the upper portion of the front surface of the display 260 in the folded state, the area 260a of the display 260 may be referred to as a first surface or a main area.

Figure 2C:
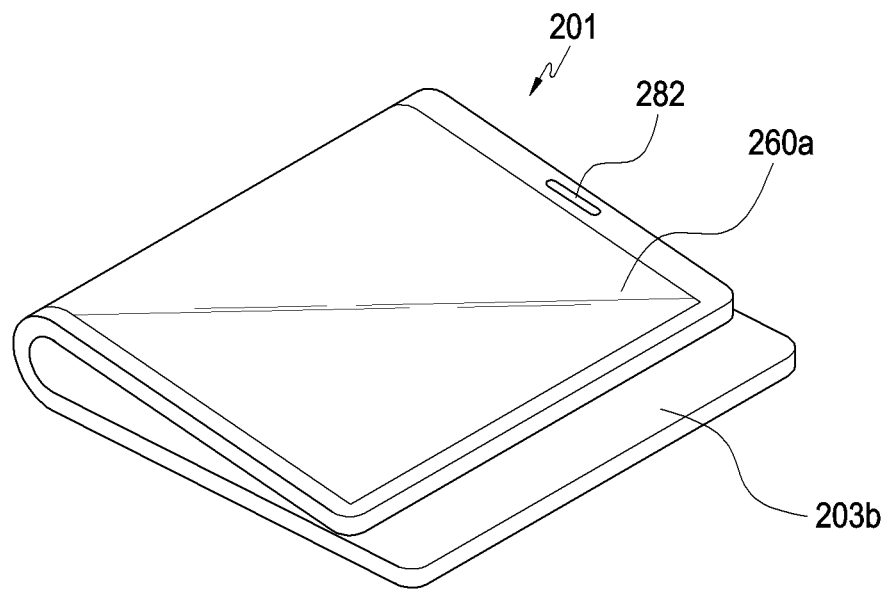

Referring to FIG. 2C, the electronic device 201 may include a flexible display 260 and may be configured such that a portion 203b of the back surface of the electronic device 201 is exposed in the folded state. The size of the exposed area 260a of the display 260 of FIG. 2B may be different from the size of the exposed area 260a of the display 260 of FIG. 2C depending on the location of the reference axis at which the display 260 is folded.

Figure 2D:
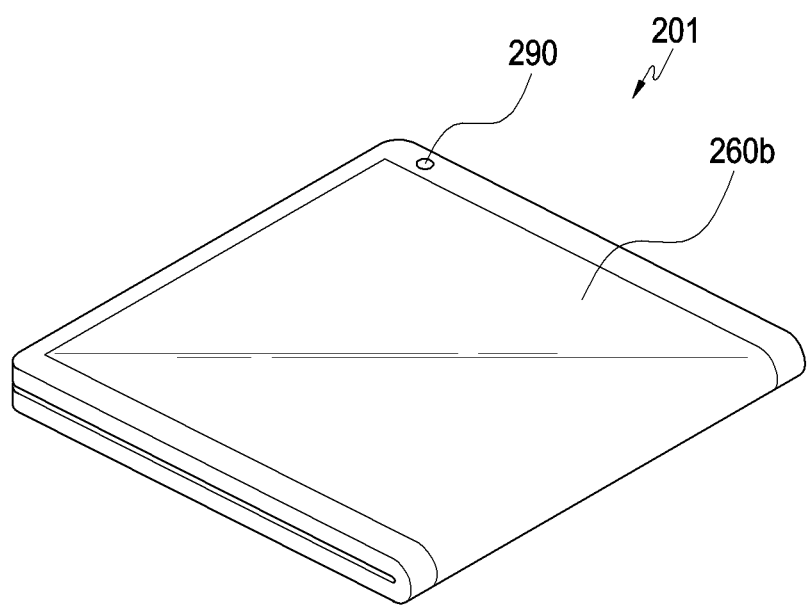

Referring to FIG. 2D, when the electronic device 201 is outwardly folded based on the reference axis, the first camera 290 may be located on the upper portion of the front surface of the display 260 and the area 260b of the display 260 may be exposed to the outside. When the first camera 290 is located on the upper portion of the front surface of the display 260 in the folded state, the area 260b of the display 260 may be referred to as a second surface or a sub area.

According to various embodiments, the reference axis may be randomly determined by a folding operation of the user, and at least one reference axis on which folding is performed may be preset in the electronic device 201.

As illustrated in FIGS. 2B and 2D, since one area of the display 260 (for example, the first area 260a or the second area 260b) exposed to the outside may vary depending on an oriented state (or a pose) of the electronic device 201, the electronic device 201 may be configured to differently display a graphic element/interface/information of a preset condition/type (for example, time information, incoming/outgoing message information, and status information of the electronic device) on the display 260 (for example, the first surface 260a or the second surface 260b of the display 260) depending on the oriented state of the electronic device 201 in the state in which the display 260 is folded to be exposed to the outside.

Figure 3A:
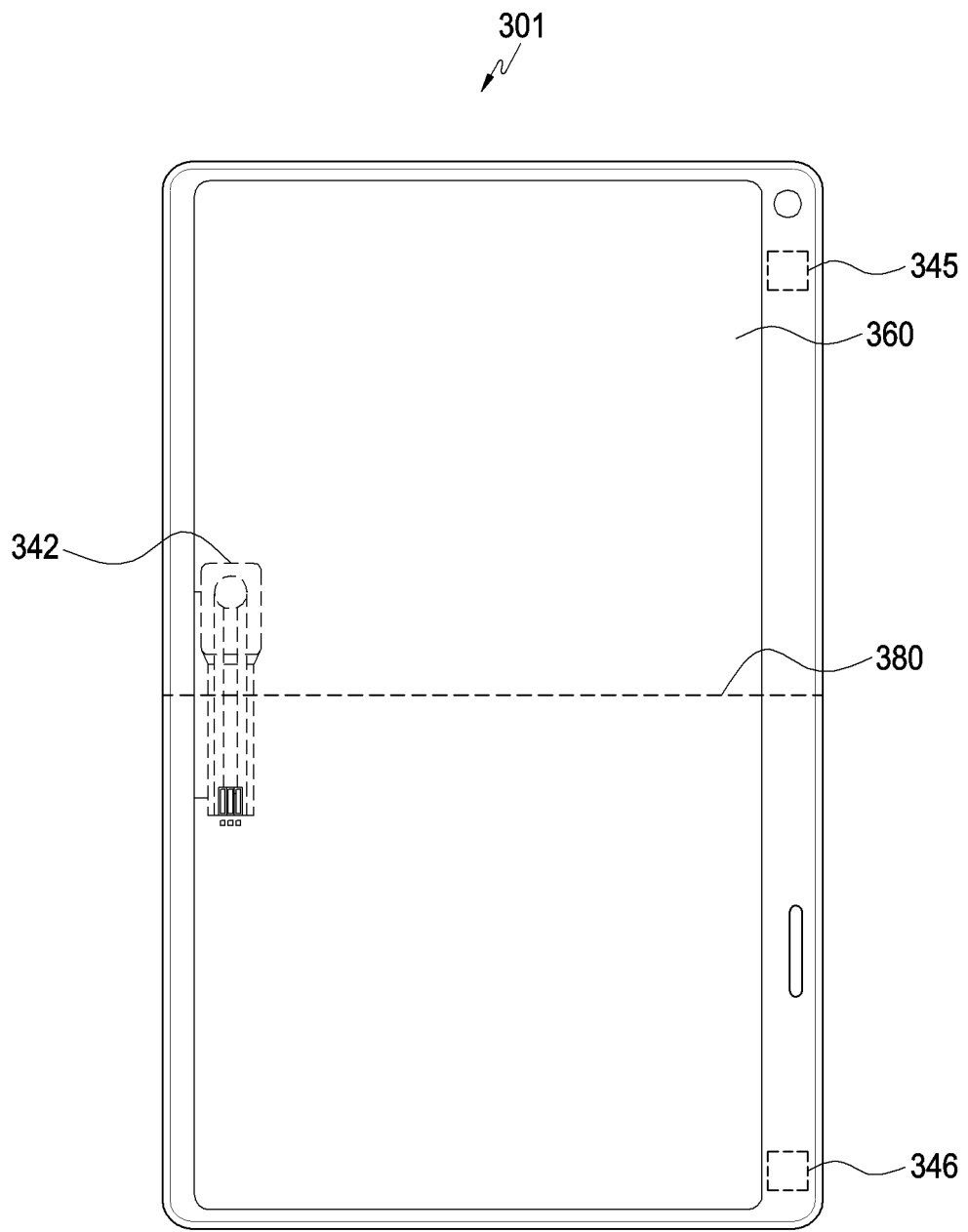
FIGS. 3A and 3B illustrate an internal structure for folding of the electronic device according to various embodiments.
Figure 3B:
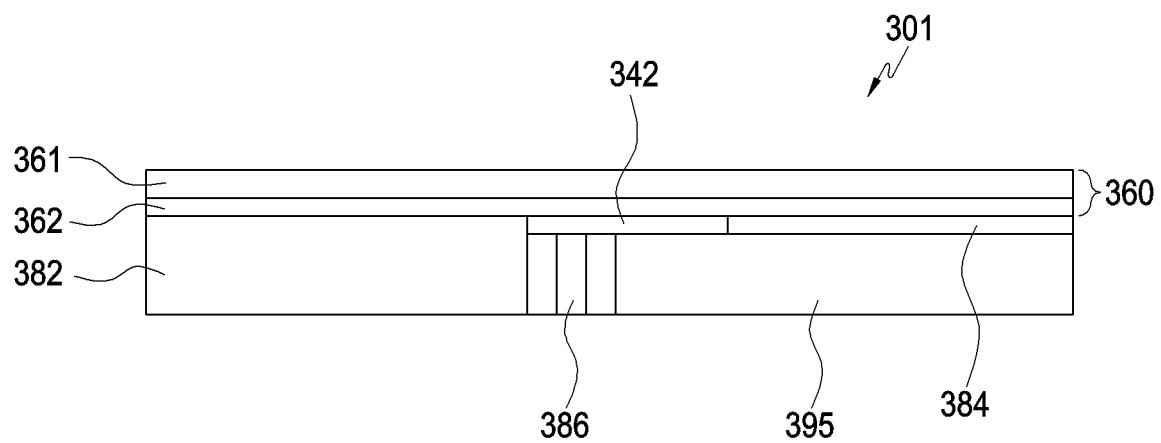

FIGS. 3A and 3B illustrate an internal structure for folding of the electronic device according to various embodiments.

FIG. 3A is a front view of an unfolded electronic device and FIG. 3B is a cross-sectional view along a horizontal direction of an electronic device.

An electronic device 301 may include a strain sensor 342 (for example, a strain gauge), a first sensor 345, a second sensor 346, a display 360, a hinge 386, an upper printed circuit board 382, a lower printed circuit board 384, and a battery 395.

The strain sensor 342 may be disposed at a location 380 on which the electronic device 301 is folded and may output a strain value used to measure a folding angle of the electronic device 301.

An angle sensor may be disposed at the location 380 on which the electronic device 301 is folded and may output a folding angle of the electronic device 301 or the hinge 386.

The first sensor 345 may be disposed at the edge of the front surface or the back surface of the electronic device 301 located on one of both ends of the display 360, and the second sensor 346 may be disposed on the edge of the front surface or the back surface of the electronic device 301 located on the other one of both ends of the display 160. The first and second sensors 345 and 346 may be disposed to face each other and may detect a change in the folding state of the electronic device 301.

For example, each of the first and second sensors 345 and 346 may include at least one of a distance and a gyroscope sensor. Alternatively, the first sensor 345 may be a magnetic force detection sensor and the second sensor 346 may be a magnetic force application unit. For example, in response to an operation of bending the electronic device 301, a distance between the first sensor 345 corresponding to the magnetic force detection sensor and the second sensor 346 corresponding to the magnetic force application unit may be closer, and accordingly, an intensity of magnetic force by the magnetic force application unit may be detected by the magnetic force detection sensor. As described above, since the intensity of magnetic force is different as the distance between the magnetic force detection sensor and the magnetic force application unit is closer, the electronic device 301 may calculate an angle at which the electronic device 301 is folded on the basis of the intensity of the magnetic force.

The display 360 may include a flexible panel 361 for displaying an image and a third sensor 362 for detecting at least one of pressure and fingerprint.

The upper printed circuit board 382 and the lower printed circuit board 384 may be separated from each other with the hinge 386 therebetween and may be electrically connected to each other through a flexible connector.

The hinge 386 (for example, a free stop hinge) may maintain the folded state of the electronic device 301 at various angles.

FIGS. 3A and 3B illustrate the case in which the strain sensor 342 for detecting folding of the electronic device 301 or folding of the electronic device 360 is disposed at the folded location, but the sensor for detecting bending (or folding) of the display 360 may be disposed on an entirety or a portion of the display 360. The display 360 may be folded in half or folded on the reference axis, but the display 360 may have a bendable characteristic in which the folding location is not limited if the display 360 has a bendable structure and material. In the case of the flexible display 360 having the bendable characteristic, the sensor for detecting bending may detect bending information such as a bending direction, a bending degree, and a bending location.

Figure 4A:
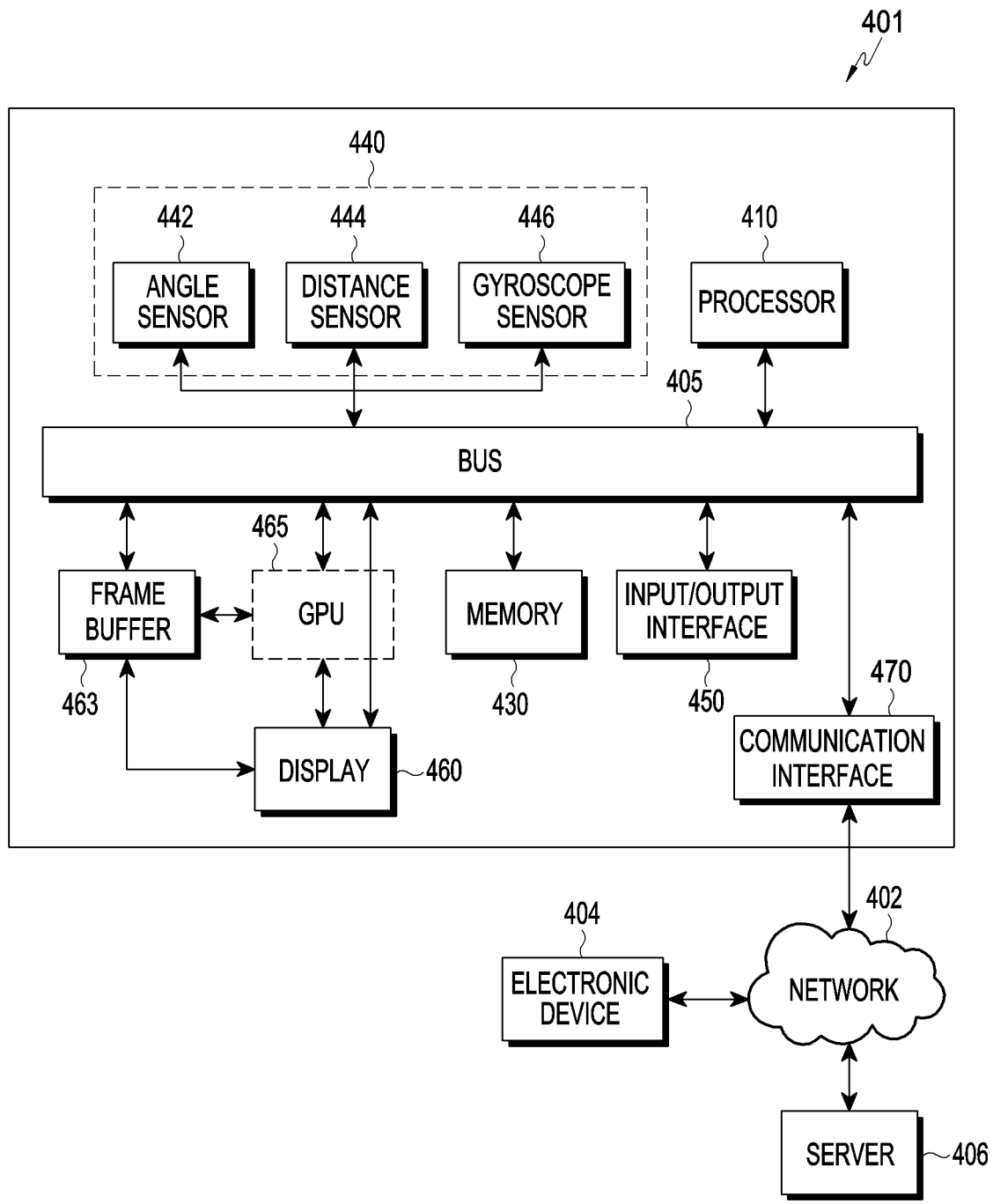
FIG. 4A illustrates the electronic device within a network environment according to various embodiments.

An electronic device 401 within a network environment is described according to various embodiments with reference to FIG. 4A. An electronic device 401 (for example, the electronic device 101) may include a bus 405, a processor 410, a memory 430, a sensor module 440, an input/output interface 450, a display 460 (for example, the display 160), and a communication interface 470. In some embodiments, the electronic device 401 may omit at least one of the elements, or may further include other elements. For example, the electronic device 401 may further include at least one of a frame buffer 463 and a Graphic Processing Unit (GPU) 465.

The bus 405 may include a circuit for connecting the elements 410 to 170 and transmitting communication (for example, control messages or data) between the elements. The processor 410 may include one or more of a central processing unit, an application processor, and a Communication Processor (CP). The processor 410 may carry out, for example, operations or data processing relating to control and/or communication of one or more other elements of the electronic device 401.

The memory 430 may include volatile and/or nonvolatile memory. The memory 430 may store, for example, instructions or data relevant to at least one other element of the electronic device 401. According to an embodiment, the memory 430 may store software and/or programs. The programs may include, for example, kernel, middleware, Application Programming Interface (API), and/or applications (or "apps"). At least some of the kernel, the middleware, or the API may be referred to as an operating system. For example, the kernel may control or manage the system resources (for example, the bus 405, the processor 410, the memory 430, and the like) that are used to execute operations or functions implemented in the other programs (for example, the middleware, the API, or the applications). Further, the kernel may provide an interface for controlling or managing system resources as the middle, the API, or the applications access individual elements of the electronic device 401.

The middleware may serve as a relay to allow the API or the applications to communicate with the kernel and exchange data. Further, the middleware may process one or more task requests received from the application according to priorities thereof. For example, the middleware may assign a priority to at least one of the applications to first use the system resources (for example, the bus 405, the processor 410, or the memory 430) of the electronic device 401 and process one or more task requests. The API is an interface by which the application controls functions provided by the kernel or the middleware and may include, for example, at least one interface or function (for example, instruction) for controlling a file, controlling a window, processing an image, or controlling a message.

The sensor module 440 may measure, for example, a physical quantity or detect the operating state of the electronic device 401, and may convert the measured or detected information into an electrical signal. The sensor module 440 may include at least one of, for example, an angle sensor 442, a distance sensor 444, and a gyroscope sensor 446. The sensor module 440 may include at least one of a Global Navigation Satellite System (GNSS), a Global Positioning System (GPS), a gesture sensor, an atmospheric pressure sensor, a magnetic sensor, an acceleration sensor, a grip sensor, a proximity sensor, a color sensor (for example, a Red, Green, and Blue (RGB) sensor), a biometric sensor, a temperature/humidity sensor, an illumination sensor, and an Ultraviolet (UV) sensor. Additionally or alternatively, the sensor module 440 may include, for example, an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 440 may further include a control circuit for controlling one or more sensors included therein. In some embodiments, the electronic device 401 may further include a processor configured to control the sensor module 440 as a part of or separately from the AP 410, and may control the sensor module 440 while the AP 410 is in a sleep state.

The input/output interface 450 may transfer commands or data input from, for example, a user or another external electronic device to other element(s) or output commands or data received from other element(s) of the electronic device 401 to the user or another external device. The input/output interface 450 may include at least one of, for example, a speaker, a receiver, earphones, and a microphone.

The display 460 may include at least one of, for example, a Liquid Crystal Display (LCD), a Light Emitting Diode (LED) display, an Organic Light Emitting Diode (OLED) display, a Micro Electro Mechanical System (MEMS) display, an electronic paper display, and a projector. The display 460 may display, for example, various pieces of content (for example, text, images, videos, icons, and/or symbols) to the user.

The frame buffer 463 may store pixel values or pixel color values to be output to the display 460 and may be implemented as the memory, the GPU 465, the display 460, a memory within a display controller, or a virtual device such as a frame buffer device of Linux.

The GPU 465 may generate a screen including various objects such as items, images, and text. The GPU 465 may calculate at least one attribute value such as a coordinate value of each object to be displayed, a form, a size, and a color of the object according to a layout of the screen and generate a screen in various layouts including the object on the basis of the calculated attribute value. Hereinafter, the screen or the application screen may refer to an entirety or a portion of the image displayed on the surface of the display 460 (or a display area). For example, the application screen may be referred to as a graphic interface, a Graphic User Interface (GUI), an application window, or an application area.

The communication interface 470 may establish communication between, for example, the electronic device 401 and an external device (for example, an external electronic device 404 or a server 406). For example, the communication interface 470 may be connected to a network 402 through wireless communication or wired communication and communicate with an external device (for example, the second external electronic device 404 or the server 406).

The wireless communication may include, for example, cellular communication that uses at least one of LTE, LTE-Advanced (LTE-A), code-division multiple access (CDMA), wideband CDMA (WCDMA), universal mobile telecommunications system (UMTS), wireless broadband (WiBro), global system for mobile communications (GSM), or the like. According to an embodiment, the wireless communication may include, for example, at least one of Wi-Fi, Bluetooth, Bluetooth Low Energy (BLE), ZigBee, Near Field Communication (NFC), magnetic secure transmission, Radio Frequency (RF), and Body Area Network (BAN). According to an embodiment, the wireless communication may include a GNSS. The GNSS may be, for example, a global positioning system (GPS), a global navigation satellite system (GLONASS), a BeiDou navigation satellite system (hereinafter, referred to as "BeiDou"), or Galileo (the European global satellite-based navigation system). Hereinafter, in this document, the term "GPS" may be interchangeable with the term "GNSS". The wired communication may include, for example, at least one of a Universal Serial Bus (USB), a High-Definition Multimedia Interface (HDMI), Recommended Standard 232 (RS-232), power line communication, a Plain Old Telephone Service (POTS), and the like. The network 402 may include a telecommunications network, for example, at least one of a computer network (for example, a LAN or a WAN), the Internet, and a telephone network.

The external electronic device 404 may be the same type as or a different type from the electronic device 401. According to various embodiments, all or some of the operations executed by the electronic device 401 may be executed by another electronic device or a plurality of electronic devices (for example, the external electronic device 404 or the server 406). According to an embodiment, when the electronic device 401 should perform some functions or services automatically or by a request, the electronic device 401 may additionally make a request for at least some functions related thereto to another device (for example, the electronic device 404 or the server 406) instead of executing them by itself. Another electronic device (for example, the electronic device 404 or the server 406) may perform a requested function or an additional function and transfers the result to the electronic device 401. The electronic device 401 may provide the received result as it is, or may perform additional processing to provide the requested functions or services. To this end, for example, cloud-computing, distributed-computing, or client-server-computing technology may be used.

Figure 4B:
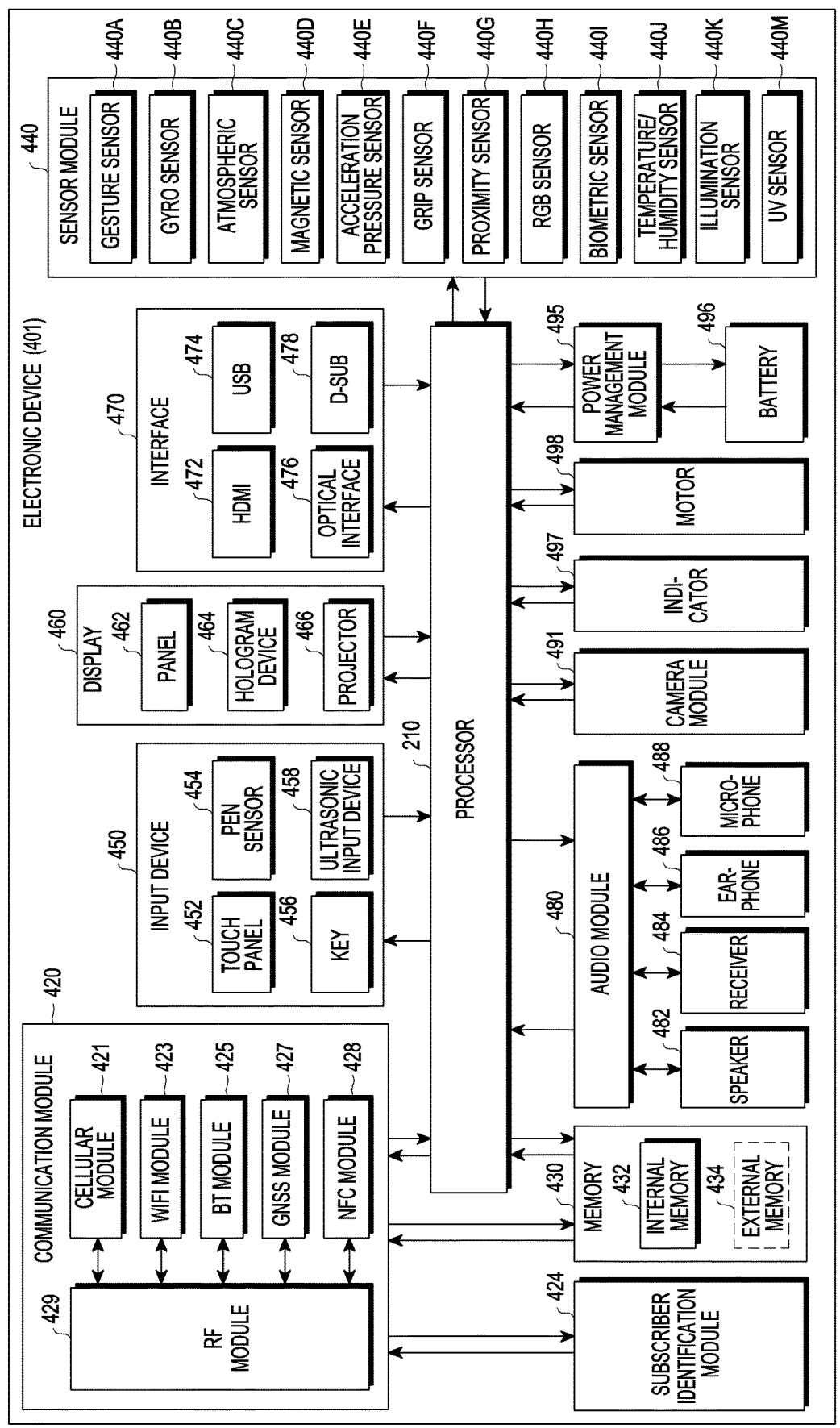
FIG. 4B is a block diagram of the electronic device according to various embodiments.

FIG. 4B is a block diagram of the electronic device 401 according to various embodiments. The electronic device 401 may include, for example, all or some of the electronic device 401 illustrated in FIG. 4A. The electronic device 401 may include one or more processors (for example, the AP) 410, a communication module 420, a subscriber identification module 424, a memory 430, a sensor module 440, an input/output interface 450, a display 460, a communication interface 470, an audio module 480, a camera module 491, a power management module 495, a battery 496, an indicator 497, and a motor 498. The processor 410 may control a plurality of hardware or software elements connected to the processor 410 and may perform various data processing and operations by driving an operating system or an application. The processor 410 may be implemented by, for example, a System on Chip (SoC). According to an embodiment, the processor 410 may further include a graphic processing unit (GPU) and/or an image signal processor. The processor 410 may include at least some of the elements illustrated in FIG. 4B (for example, the cellular module 421). The processor 410 may load commands or data received from at least one of other elements (for example, the nonvolatile memory) to the volatile memory, process the commands or data, and store resultant data in the nonvolatile memory.

The communication module 420 (for example, the communication interface 470 of FIG. 4A) may include, for example, a cellular module 421, a Wi-Fi module 423, a Bluetooth module 425, a GNSS module 427, an NFC module 428, and an RF module 429. The cellular module 421 may provide, for example, a voice call, a video call, a text message service, an Internet service, or the like through a communication network. According to an embodiment, the cellular module 421 may identify and authenticate the electronic device 401 within the communication network using a subscriber identification module (for example, a SIM card) 424. According to an embodiment, the cellular module 421 may perform at least some of the functions that the processor 410 may provide. According to an embodiment, the cellular module 421 may include a Communication Processor (CP). According to some embodiments, at least some (for example, two or more) of the cellular module 421, the Wi-Fi module 423, the BT module 425, the GNSS module 427, and the NFC module 428 may be included in one Integrated Chip (IC) or IC package. The RF module 429 may transmit and receive, for example, a communication signal (for example, an RF signal). The RF module 429 may include, for example, a transceiver, a Power Amp Module (PAM), a frequency filter, a Low-Noise Amplifier (LNA), an antenna, or the like. According to another embodiment, at least one of the cellular module 421, the Wi-Fi module 423, the BT module 425, the GNSS module 427, and the NFC module 428 may transmit/receive an RF signal through a separate RF module. The subscriber identification module 424 may include, for example, a card that includes a subscriber identity module and/or an embedded SIM, and may contain unique identification information (for example, an Integrated Circuit Card Identifier (ICCID)) or subscriber information (for example, an International Mobile Subscriber Identity (IMSI)).

The memory 430 may include, for example, an internal memory 432 or an external memory 434. The internal memory 432 may include, for example, at least one of a volatile memory (for example, a DRAM, an SRAM, an SDRAM, or the like) and a non-volatile memory (for example, a One Time Programmable ROM (OTPROM), a PROM, an EPROM, an EEPROM, a mask ROM, a flash ROM, a flash memory, a hard disc drive, or a solid state drive (SSD)). The external memory 434 may include a flash drive, for example, a compact flash (CF), a secure digital (SD), a Micro-SD, a Mini-SD, an eXtreme digital (xD), a multi-media card (MMC), a memory stick, and the like. The external memory 434 may be functionally and/or physically connected to the electronic device 401 through any of various interfaces.

The sensor module 440 may measure, for example, a physical quantity or detect the operating state of the electronic device 401, and may convert the measured or detected information into an electrical signal. The sensor module 440 may include, for example, at least one of a gesture sensor 440A, a gyro sensor 440B, an atmospheric pressure sensor 440C, a magnetic sensor 440D, an acceleration sensor 440E, a grip sensor 440F, a proximity sensor 440G, a color sensor 440H (for example, a red, green, blue (RGB) sensor), a biometric sensor 440I, a temperature/humidity sensor 440J, an illumination sensor 440K, and an ultraviolet (UV) sensor 440M. Additionally or alternatively, the sensor module 440 may include, for example, an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 440 may further include a control circuit for controlling one or more sensors included therein. In some embodiments, the electronic device 401 may further include a processor configured to control the sensor module 440 as a part of or separately from the AP 410, and may control the sensor module 440 while the AP 410 is in a sleep state.

According to an embodiment, the processor 410 may measure ambient illumination through the illumination sensor 440K and determine if the electronic device is located in a dark place such as a theater on the basis of the measured illumination value. The processor 410 may use the measured illumination value to determine a display type of determining brightness of the display 460 and controlling at least some areas of the display 460 to be in an on state when a notification event is output.

According to an embodiment, the processor 410 may determine a folding state of the display 460 and an oriented state of the electronic device 401 through at least one of the gyro sensor 440B, the magnetic sensor 440D, the acceleration sensor 440E, and the proximity sensor 440G.

The input/output interface 450 may include, for example, a touch panel 452, a (digital) pen sensor 454, a key 456, or an ultrasound input device 458. The touch panel 452 may be, for example, at least one of a capacitive type, a resistive type, an infrared type, and an ultrasonic type. Furthermore, the touch panel 452 may further include a control circuit. The touch panel 452 may further include a tactile layer to provide a tactile reaction to a user. The (digital) pen sensor 454 may include, for example, a recognition sheet that is a part of, or separate from, the touch panel. The key 456 may include, for example, a physical button, an optical key, or a keypad. The ultrasound input device 458 may detect an ultrasound wave generated by an input tool through a microphone (for example, the microphone 488) and identify data corresponding to the detected ultrasound wave.

According to an embodiment, the processor 410 may measure an ambient noise value input through the microphone 488 and compare the measured ambient noise value with a threshold value so as to determine whether the output of the sound is restricted. The threshold value to be compared with the ambient noise value may be preset. For example, when the measured ambient noise value corresponds to a value lower than the threshold value which is measured in a place such as a meeting room, the processor 410 may perform control to prevent a notification sound from being output through the speaker 482 even though a notification event is generated.

The display 460 may include a panel 462, a hologram device 464, a projector 466, and/or a control circuit for controlling them. The panel 462 may be implemented to be, for example, flexible, transparent, or wearable. The panel 462, together with the touch panel 452, may be configured as one or more modules. According to an embodiment, the panel 462 may include a pressure sensor (or a POS sensor) which may measure the strength of pressure of a user's touch. The pressure sensor may be implemented so as to be integrated with the touch panel 452, or may be implemented as one or more sensors separate from the touch panel 452. The hologram device 464 may show a three-dimensional image in the air using light interference. The projector 466 may display an image by projecting light onto a screen. The screen may be located, for example, in the interior of, or on the exterior of, the electronic device 401.

According to an embodiment, the display 460 may include a flexible display. The flexible display may be folded by external physical force. When the flexible display is outwardly folded by external physical force, images displayed on the flexible display may be separated from each other. For example, the display may be divided into a first area and a second area based on a part on which the flexible display is outwardly folded, and an image displayed on the unfolded display may be changed to correspond to the first area and the second area. Further, different screens (or images) may be displayed in the first area (or a first surface) and the second area (or a second surface) separated according to folding of the flexible display in half.

According to an embodiment, in the folded state, the first area and the second area of the display 460 may be implemented to have different attributes (for example, size, shape, brightness, color, saturation, definition, contrast, permeability, gamma, resolution, contrast range, viewing angle, color reproduction range, color temperature, grayscale linearity, and transparency).

According to an embodiment, in the folded state, when the electronic device is oriented in a state in which the first area of the display 460 faces upwardly/the user/forwardly and the second area thereof faces a direction opposite the direction in which the first area faces, the first area and the second area may output screens having different attributes. At this time, when one of the first area and the second area contacts the floor, the user cannot see the area corresponding to the contacting area, so that the area corresponding to the contacting area may be turned off and the area exposed to the user may be turned on.

The communication interface 470 may include, for example, an HDMI 472, a USB 474, an optical interface 476, or a D-subminiature (D-sub) interface 478. The communication interface 470 may be included in, for example, the communication interface 470 illustrated in FIG. 4A. Additionally or alternatively, the interface 470 may, for example, include a mobile high-definition link (MHL) interface, a secure digital (SD) card/multi-media card (MMC) interface, or an infrared data association (IrDA) standard interface.

The audio module 480 may convert, for example, sound into an electrical signal and vice versa. At least some elements of the audio module 480 may be included in, for example, the input/output interface 450 illustrated in FIG. 4A. The audio module 480 may process sound information that is input or output through, for example, a speaker 282, a receiver 284, earphones 286, the microphone 288, and the like. The camera module 491 (for example, the first camera 190 and the second camera 192) is a device that can take a still image and a moving image. According to an embodiment, the camera module 491 may include one or more image sensors (for example, a front sensor or a rear sensor), a lens, an image signal processor (ISP), or a flash (for example, an LED or xenon lamp). The power management module 495 may manage, for example, the power of the electronic device 401. According to an embodiment, the power management module 495 may include a Power Management Integrated Circuit (PMIC), a charger IC, or a battery or fuel gauge. The PMIC may use a wired and/or wireless charging method. Examples of the wireless charging method may include a magnetic resonance method, a magnetic induction method, an electromagnetic-wave method, and the like. Additional circuits (for example, a coil loop, a resonance circuit, a rectifier, and the like) for wireless charging may be further included. The battery gauge may measure, for example, the remaining charge of the battery 496 and a voltage, current, or temperature while charging. The battery 496 may include, for example, a rechargeable battery and/or a solar battery.

The indicator 497 may display a specific status of the electronic device 401 or a portion thereof (for example, the processor 410), for example, a booting status, a message status, or a charging status. The motor 498 may convert an electrical signal into a mechanical vibration and may generate a vibration, a haptic effect, or the like. The electronic device 401 may include a mobile TV support device (for example, a GPU) that can process media data according to a standard, such as digital multimedia broadcasting (DMB), digital video broadcasting (DVB), mediaFlo™, and the like. Each of the above-described component elements of hardware according to the disclosure may be configured with one or more components, and the names of the corresponding component elements may vary based on the type of electronic device. According to various embodiments, an electronic device (for example, the electronic device 401) may omit some elements or further include additional elements, or some of the elements may be combined and thus configured as a single entity but the original functions of the corresponding elements before the combination may be equally performed.

According to an embodiment, an electronic device may include a flexible display, and a processor configured to, when a notification event is generated in a folded state in which the display is divided into a first area and a second area, perform control to process the notification event in a first type using at least one of the first area and the second area when the electronic device is in a first oriented state and process the notification event in a second type using at least one of the first area and the second area when the electronic device is in a second oriented state.

According to an embodiment, the electronic device (or a processor) may perform control to display information of the notification event in the first area in the first type when the electronic device is in the first oriented state and determine whether the notification event can be output in the second type when the electronic device is in the second oriented state. According to an embodiment, the first type may be a preset type and the second type may be a display type according to a user setting.

According to an embodiment, when the electronic device is in the second oriented state and the notification event corresponds to an application set to allow an output of the notification event, the electronic device (or a processor) may perform control to display the information of the notification event in the second area.

According to an embodiment, when the electronic device is in the second oriented state and the notification event corresponds to an application set not to allow an output of the notification event, the electronic device (or a processor) may limit the output of the notification event. For example, the electronic device may process not to display the notification event on the screen or not to generate a notification sound.

According to an embodiment, the electronic device (or a processor) may perform control to display the information of the notification event in the second area in an always-on-displayed type.

According to an embodiment, when the information of the notification event is displayed in the second area, the electronic device (or a processor) may control the first area to be in an off state and the second area to be in an on state. For example, an entirety of the second area or only an area of an always-on-displayed screen may be controlled to be in an on state.

According to an embodiment, the electronic device may include a memory configured to store information for setting whether to allow an output of the notification event for each of at least one application.

According to an embodiment, when the electronic device is in the second oriented state, the electronic device (or a processor) may determine whether the notification event can be output using the information stored in the memory.

According to an embodiment, the electronic device may include a first sensor configured to detect a folded state of the display and a second sensor configured to detect the oriented state of the electronic device, and the oriented state of the electronic device may be determined using various sensors such as an acceleration sensor, a gyro sensor, a proximity sensor, and a camera module.

Figure 5A:
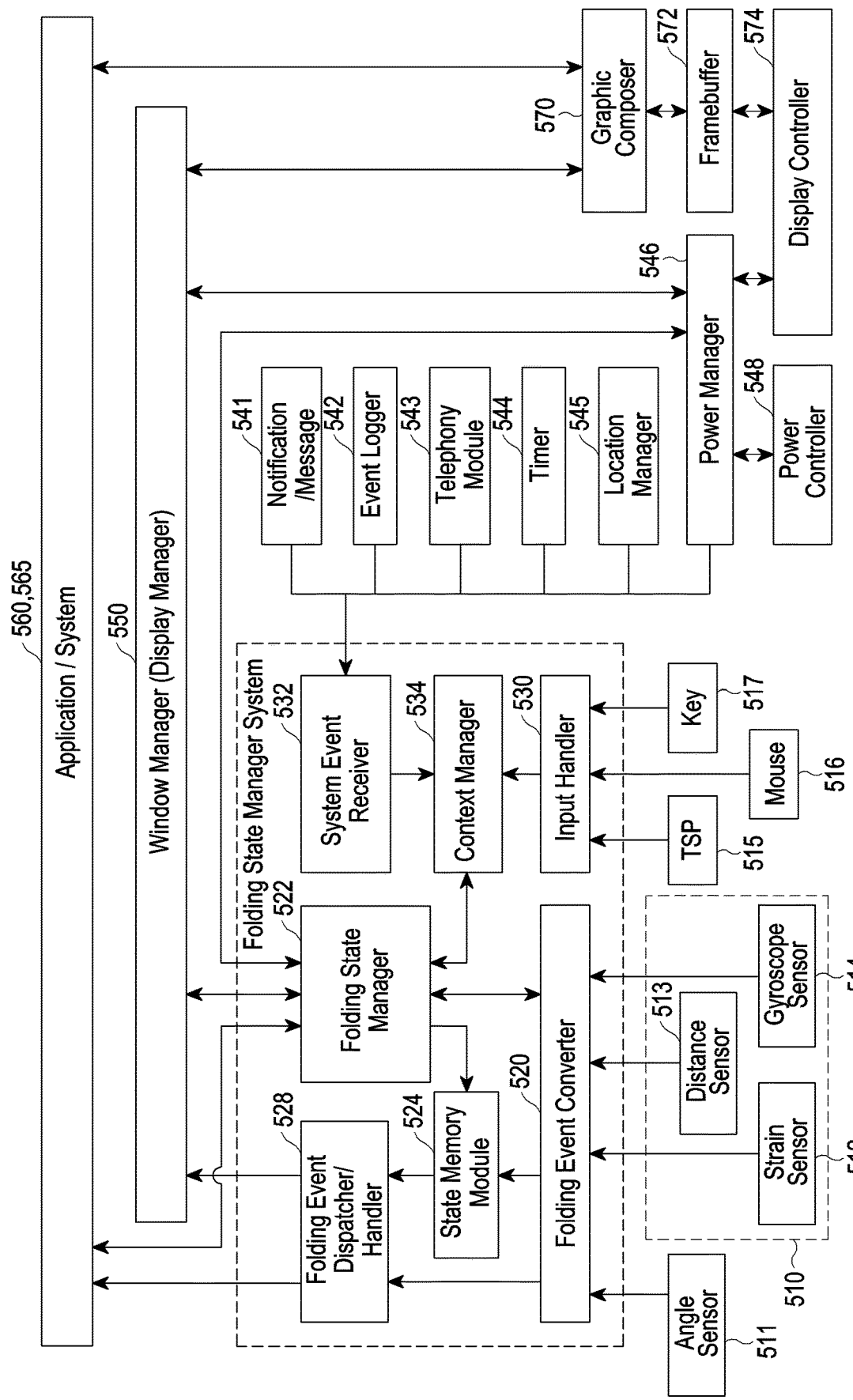
FIGS. 5A, 5B, 5C are diagrams for describing a program module according to various embodiments.
Figure 5B:
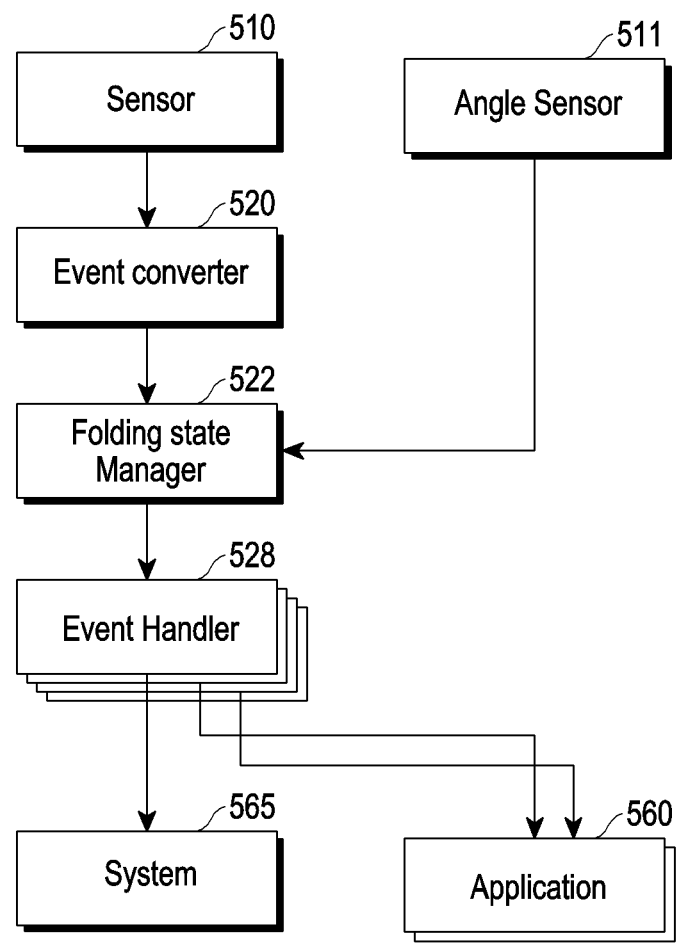
Figure 5C:
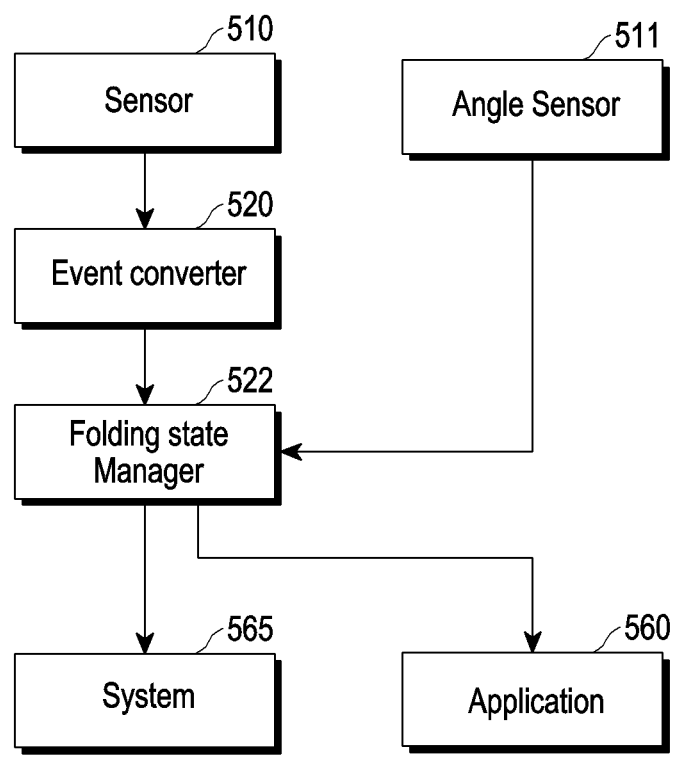

FIGS. 5A to 5C are diagrams for describing a program module according to various embodiments.

FIG. 5A is a block diagram of a program module according to various embodiments. According to an embodiment, the program module may include an operating system for controlling resources associated with the electronic device (for example, the electronic device 101, 201, 301, or 401) and/or various applications executed by the operating system. The operating system may include, for example, Android™, iOS™, Windows™, Symbian™, Tizen™, or Bada™. At least some of the program module may be preloaded to the electronic device or can be downloaded from an external electronic device (for example, the electronic device 404 or the server 406).

A folding event converter 520 (or referred to as an event converter) may calculate at least one of a folding state and an oriented state by analyzing raw data received from a sensor 510 (for example, a strain sensor 512, a distance sensor 513, a gyroscope sensor 514, an acceleration sensor (not shown), or a proximity sensor (not shown)). Hereinafter, folding may be referred to as bending, and a folding event may be referred to as a folding gesture. The event converter 520 may determine the current oriented state of the electronic device according to whether a main surface (for example, 260a) of an electronic device (for example, the electronic device 101, 201, 301, or 401) faces downwardly or a sub surface (for example, 260b) faces downwardly.

A folding event dispatcher/handler 528 (or referred to as an event handler) may transfer a folding state/event and an oriented state to a system 565 or an application 560.

A folding state manager 522 may transfer the folding state and the oriented state to the corresponding module.

A state memory module 524 may store the folding state and the oriented state.

A notification/message manager 541 may provide the user with a notification event such as notification of a Social Network Service (SNS) message, an incoming message, an appointment, and proximity. According to an embodiment, whether to output event information may be determined according to a user setting mode depending on an oriented state determined by the event converter 520, and when the current oriented state corresponds to a user setting mode, event information may be output in a preset type. For example, when the electronic device (for example, the electronic device 101, 201, 301, or 401) is oriented in a state in which the main surface (for example, 260a) faces downwardly, event information may be output on the sub surface (for example, 260b) in a type corresponding to the user setting mode. When the electronic device is oriented in a state in which the main surface (for example, 260a) faces downwardly), a notification event may be displayed on the sub surface (for example, 260b) in an Always-On-Displayed (AOD) form in accordance with the user setting mode, and sound output and vibration output may be omitted. At this time, when event information is output, the main surface (for example, 260a) faces downwardly, so that if the display 260 is turned off, the main surface (for example, 260a) may remain in the off state and an entirety or a portion of the sub surface (for example, 260b) may be turned on. When the output of the event information is released in the user setting mode, if the electronic device is oriented in a state in which the main surface (for example, 260a) faces downwardly, the output of a notification event may be omitted when the notification event is generated.

An event logger 542 may record events and display the same in chronological order.

A telephony module 543 may manage a voice/video call function of the electronic device.

A timer 544 may provide a timer function.

A location manager 545 may manage, for example, location information of the electronic device.

A power manager 546 may interwork with, for example, a power controller 548, mange capacity or power of the battery, and provide power information required for the operation of the electronic device.

A system event receiver 532 may receive an event from the notification/event manager 541, the event logger 542, the telephony module 543, the timer 544, or the power manager 546 and transfer the event to a context manager 534.

An input handler 530 may receive an input from a TSP 515, a mouse 516, or a key 517 and transfer the input to the context manager 534.

The context manager 534 may manage a system service on the basis of an input, a system event, a folding state, or an oriented state.

A display controller 574 may control screen on/off.

A frame buffer 572 may store pixel values or pixel color values to be output to the display.

A graphic composer 570 may generate a screen including various objects such as items, images, or text.

A window manager 550 may manage GUI resources used for a screen.

For example, the application 560 may include a home application, a dialer application, an SMS/MMS/Instant Message (IM) application, a browser application, a camera application, an alarm application, a contact application, a voice dial application, an email application, a calendar application, a media player application, an album application, a clock application, a health care application (for example, measurement of exercise quantity or blood sugar), or an environmental information (for example, atmospheric pressure, humidity, or temperature information) provision application.

At least some of the program module may be implemented (for example, executed) as software, firmware, hardware (for example, the processor), or a combination of two or more thereof, and may include a module, a program, a routine, a command set, or a process for performing one or more functions.

Referring to FIGS. 3A to 5B, the event converter 520 may calculate a folding state by analyzing raw data of the sensor 510. For example, when each of the first sensor 345 and the second sensor 346 includes a gyroscope sensor, the event converter 520 may calculate a folding angle of the electronic device 301 by comparing an angle between an axis of the first sensor 345 measured by the first sensor 345 and the ground with an angle between an axis of the second sensor 346 measured by the second sensor 346 and the ground.

Alternatively, when the first sensor 345 includes a magnetic force detection sensor and the second sensor 346 includes a magnetic force application unit, an intensity of magnetic force by the magnetic force application unit may be detected in response to the operation of bending the electronic device 301.

In this case, since the detected intensity of magnetic force is proportional to the folding angle, the intensity of magnetic force may become larger as the electronic device 301 is further folded, and the event converter 520 may calculate the folding angle of the electronic device 301 on the basis of the intensity of magnetic force.

The folding state may be measured directly through the angle sensor 511 or determined through calculation by the event converter 520. The folding state may be expressed as the angle itself, one state corresponding to a predetermined angle range, or an increase/decrease in the angle.

The oriented state may be determined on the basis of a value measured by at least one of the gyroscope sensor 514, the acceleration sensor, the gyro sensor, and the proximity sensor. For example, when the electronic device (for example, 101, 201, 301, or 401) is positioned on the floor in the folded state, the electronic device may compare a value measured through the acceleration sensor with a preset reference value and determine the oriented state of the electronic device (for example, 101, 201, 301, or 401) when there is no motion, for example, when the measured value is 0. Further, when the electronic device is positioned on the floor, the oriented state of the electronic device may be determined through a camera (for example, the first camera 190) as well as the proximity sensor. For example, when the electronic device is positioned such that the sub surface on which the first camera 190 is located faces downwardly, an image captured by the first camera 190 may be black, so that the electronic device may determine which surface faces upwardly and which surface is exposed on the basis of the captured image.

According to an embodiment, the electronic device may determine whether the first surface 260a of the display 160 faces downwardly (for example, an upside-down state or a tiled state downwardly) through the proximity sensor disposed adjacently to the speaker 182 of the display 160. According to an embodiment, when the electronic device is oriented in state in which the first surface 260a of the display 160 faces downwardly, a private notification mode may be activated. The private notification mode may correspond to a user setting mode in which information on a notification event for at least one application set by the user is output.

For example, in the private notification mode, the size of event information may be differently displayed according to a user setting such that output of event information to the second surface 260b instead of the first surface 260a may be supported and output of a sound and vibration may be omitted, or the event information may be displayed on an always-on-displayed screen. That is, an event information output type may be variously defined. According to an embodiment, a notification event which can be set by the user may be any application requiring a user notification such as call reception, message reception, push message reception, SNS message reception, mail reception, scheduling notification, and alarm time.

The folding state manager 522 may transfer a folding state/event to the event handler 528, and the folding event may be processed by the registered event handler 528. The event handler 528 may be registered by various modules such as the system 565, the application 560, and a background service, and the registered event handler 528 may process the folding event according to a priority. For example, the priority may be determined in an order of the system 565, a visible (or activated) application, an application which is being executed but is not directly shown to the user, and a background service having no visible UI. For example, when the folding event is not processed by a high-priority event handler, the folding event may be processed by a next-priority event handler.

Sequential processing of the folding event may have the following effects.

When the electronic device is folded at a preset angle or smaller, the system 565 may display an alpha screen or a gadget. For example, the alpha screen may be freely movable and include a window for displaying at least one piece of multimedia content, user-customized information, and real time information. When a specific situation in which the first surface 260a faces downwardly occurs in the state in which the electronic device (for example, the electronic device 101, 201, 301, or 401) is given, the system 565 may not process output of event information, and when the situation is changed to the state in which the first surface 260a faces upwardly, output of event information may be processed.

Referring to FIG. 5C, the folding state manager 522 may directly transfer the folding state/event to the system 565 or the application 560 without passing through the event handler. For example, the folding state manager 522 may determine whether to transmit the folding event and a target to receive the folding event on the basis of context information of the electronic device acquired from the context manager 534.

Figure 6A:
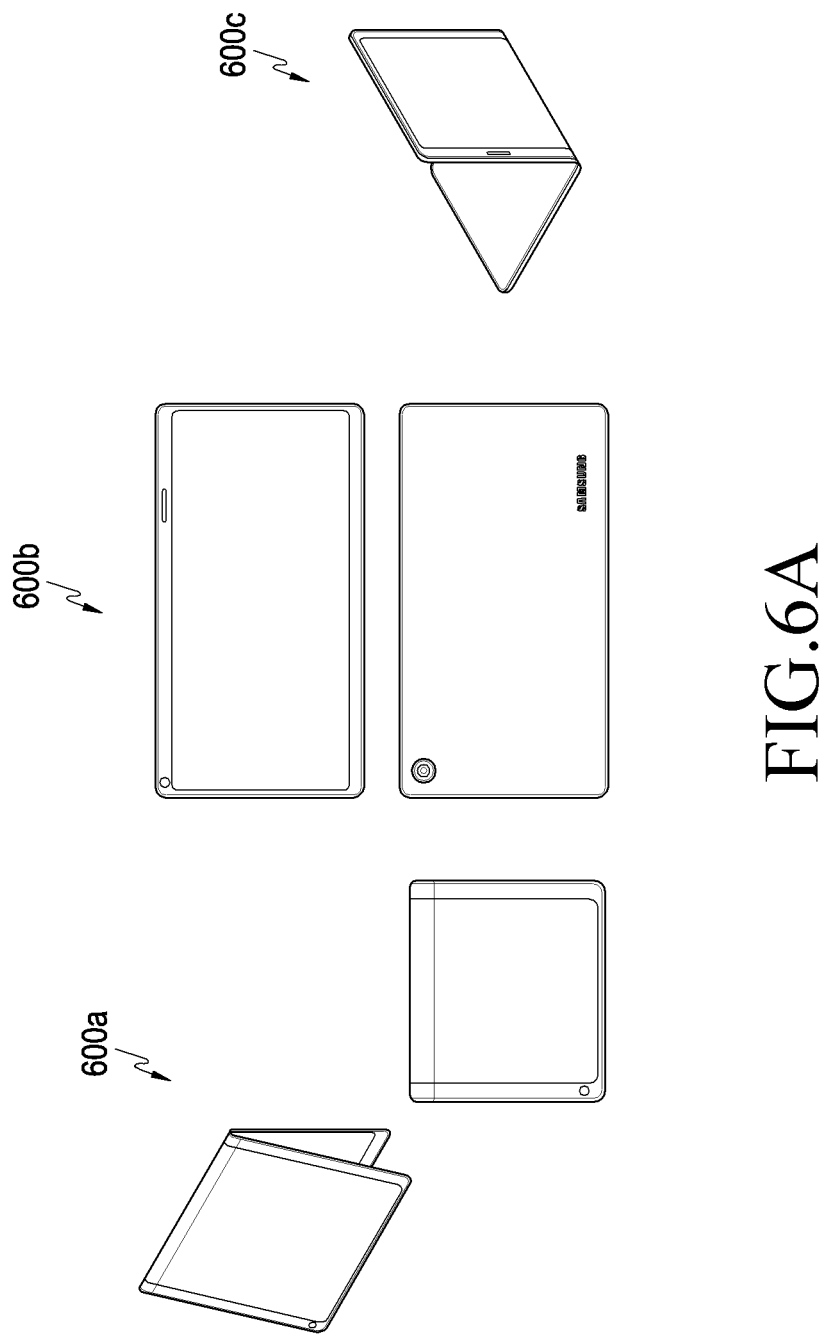
FIGS. 6A and 6B are perspective views illustrating various states of the electronic device according to various embodiments.

FIG. 6A is perspective view illustrating various states of an electronic device according to various embodiments.

A flexible electronic device may have various folding or unfolding states as illustrated in FIG. 6A. The flexible electronic device may have at least one state of a folding state 600a in which the electronic device is folded such that both ends thereof contact each other or are in proximity to each other as close as possible, an unfolding state 600*b* in which the electronic device is completely unfolded, and a standing state 600*c* in which the electronic device is inwardly folded in half as in a compact type. At this time, a ratio at which the electronic device is folded may be the half based on the center of the electronic device, but the folding ratio may be differently implemented depending on an axis.

As described above, the flexible electronic device may be folded or bent on the basis of one axis. One axis may be set in advance or randomly. The preset axis may mean that only a specific area (for example, partial areas including the axis) of a display of the flexible electronic device can be folded. On the other hand, the random axis may mean that the entire area of the display of the flexible electronic device can be folded. Although FIG. 6 illustrates that the electronic device is folded in half on the basis of an axis passing through the center of the electronic device, it may be easily understood by those skilled in the art that there is no limitation on the location of the axis.

Figure 6B:
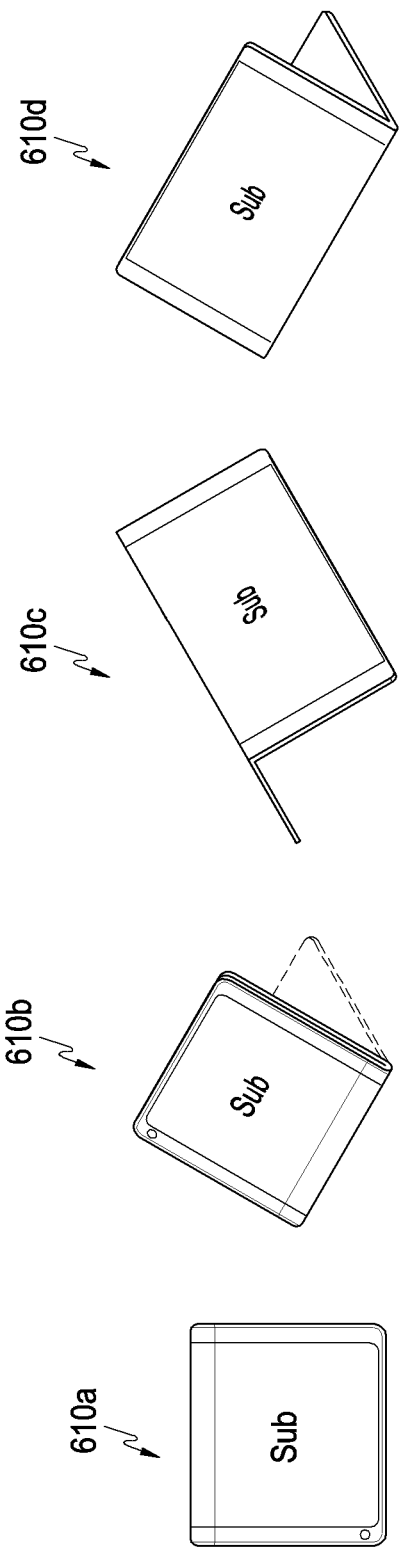

FIG. 6B is a perspective view illustrating oriented states of an electronic device to enter a mode based on a user setting according to various embodiments.

Referring to FIG. 6B, oriented states of an electronic device 101, 201, 301, or 401 according to various embodiments may be largely divided into two oriented states. In the folded state in which the display is divided into a first area and a second area, an oriented state may be determined according to which area between the first area and the second area is positioned to be exposed to the user. For example, a first oriented state may be an oriented state in which the first area of the display faces an upward/front/user direction in the folded state and a second oriented state may be an oriented state in which the second area of the display faces an upward/front/user direction in the folded state.

The electronic device may determine whether to enter a private notification mode for setting whether to output of a notification event for at least one application configured by the user depending on the oriented state of the electronic device. A mode in which the user receives only a notification event for a desired application by activating or deactivating output of a notification event for each of at least one application of which the notification event can be generated may be named a private notification mode.

For example, when the oriented state of the electronic device is an oriented state corresponding to the private notification mode, processing of displaying a notification event or omitting the displaying may be performed according to settings in the private mode when the notification event is generated. On the other hand, when the oriented state of the electronic device is an oriented state corresponding to the default mode, the electronic device may perform processing of displaying a notification event in a preset type when the notification event is generated.

FIG. 6B illustrates an oriented state of the electronic device to enter a private notification mode. For example, the oriented state in which a sub-surface of the display faces upward may be various as illustrated in FIG. 6B, and may include a state 610*a* in which the sub-surface of the display faces upward and the main surface contacts the floor in the folded state in which both end parts of the display contact each other, a state 610*b* in which the sub-surface faces a front or user direction and the main surface is tilted to face downward, a state 610*c* in which the electronic device stands as an angle between the main surface and the sub-surface is formed and the surface at which side surfaces of the main body including two surfaces is supported, and a standing state 610*d* in which the main surface contacts the contact surface (for example, the floor or table) and the sub-surface stands on the basis of the contact surface.

When the electronic device is in the oriented state as illustrated in FIG. 6B, one area (or one surface) of the display may remain in an on state and the other area (or other surface) may be turned off.

Figure 7:
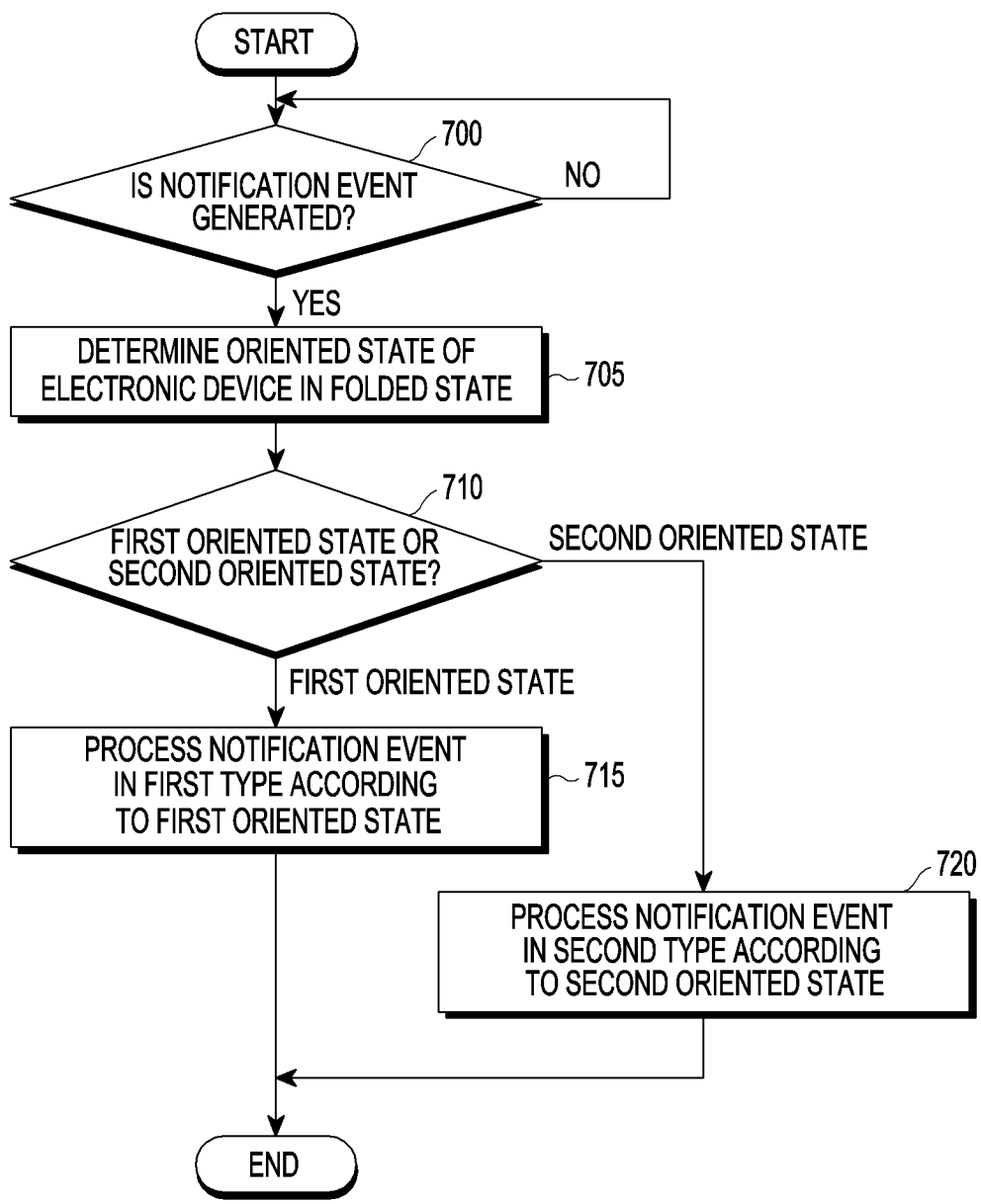
FIG. 7 is a flowchart illustrating a method of controlling a display by an electronic device according to various embodiments.

FIG. 7 is a flowchart illustrating a method of controlling a display by an electronic device according to various embodiments. Hereinafter, it is described that the method of controlling the display is performed by an electronic device (for example, the electronic device 101, 201, 301, or 401), the method of controlling the display may be performed by a processor (for example, the processor 410) of the electronic device or a controller of the electronic device.

In operation 700, the electronic device (or the processor) may determine whether a notification event is generated in a state in which a flexible display (for example, the display 160, 260, 360, or 460) is folded such that a first area and a second area are separated.

In operation 705, when the notification event is generated, the electronic device may determine an oriented state of the electronic device in the folded state of the electronic device. For example, the user may position the electronic device such that one surface of the display (for example, the display 160, 260, 360, or 460) faces downward in a state in which the electronic device is folded outwardly. The electronic device may recognize the folded state through a sensor for detecting folding and detect the oriented state of the electronic device on the basis of a sensor value acquired from at least one sensor of an acceleration sensor, a proximity sensor, and a gyro sensor.

In operation 710, the electronic device may determine whether the oriented state of the electronic device is a first oriented state or a second oriented state in the folded state.

When the oriented state of the electronic device is the first oriented state, the electronic device may process the notification event in a first type using at least one of the first area and the second area according to the first oriented state in operation 715.

When the oriented state of the electronic device is the second oriented state, the electronic device may process the notification event in a second type using at least one of the first area and the second area according to the second oriented state in operation 720.

According to an embodiment, the first oriented state may correspond to an oriented state in which the first area faces a first direction and the second area faces a direction opposite the first direction, and the second oriented state may correspond to an oriented state in which the first area faces the second direction and the second area faces the first direction. For example, the first oriented state may correspond to an oriented state in which a first surface of the display of the electronic device faces the first direction (front direction/up direction/user direction) and a second surface of the display faces the second direction (back direction/down direction/direction opposite the user) opposite the first direction, and the second oriented state may correspond to an oriented state in which the first surface of the display of the electronic device faces the second direction and the second surface of the display faces the first direction.

According to an embodiment, a method of controlling a display may include an operation of controlling, by a processor, a flexible display to divide a display area into a plurality of areas including a first area and a second area, in response to detecting of a notification event in a folded state, an operation of processing the notification event in a first type (or in a first manner) using at least one of the first area and the second area when the electronic device is in a first oriented state (or a first mounted state), and an operation of processing the notification event in a second type (or in a second manner) using at least one of the first area and the second area when the electronic device is in a second oriented state (or a second mounted state).

According to an embodiment, the first oriented state may correspond to an oriented state in which the first area faces a first direction and the second area faces a direction opposite the first direction, and the second oriented state may correspond to an oriented state in which the first area faces the second direction and the second area faces the first direction.

According to an embodiment, the electronic device (or the processor) may determine whether the notification event can be output in the second type and perform control to display information of the notification event in the second area when the notification event corresponds to an application set to allow an output of the notification event. At this time, when the notification event corresponds to an application set not to allow the output of the notification event, the output of the notification event may be limited. That is, the event information may not be output.

According to an embodiment, the operation of displaying the information of the notification event in the second area may include an operation of displaying the information of the notification event in the second area in an always-on-displayed type.

According to an embodiment, the operation of displaying the information of the notification event in the second area may include an operation of controlling the first area to be in an off state and the second area to be in an on state.

According to an embodiment, information for setting whether to allow the output of the notification event for each of at least one application may be pre-stored through a user setting, and whether the notification event can be output may be determined using the stored information when the notification event is processed in the second type.

For example, the electronic device may determine whether the electronic device is in a state in which a main surface of the display 160 is not used, that is, an oriented state in which the electronic device is positioned such that the main surface thereof faces downward and a sub-surface faces upward in the folded state. When the oriented state of the electronic device in the folded state is the first oriented state, the user may currently view the first surface of the display but cannot view the second surface of the display.

When the electronic device is in the first oriented state in which the main surface thereof faces downward and the sub-surface faces upward or faces the user, the electronic device may output a notification event according to a user setting corresponding to the notification event. For example, the electronic device may output information of the notification event on the sub-surface of the display 160 in an always-on displayed type or output the same with silence/non-vibration according to the user setting. Further, in the case of a notification event of which output is released according to the user setting, an operation for outputting the notification event may be omitted. When the electronic device is in the second oriented state in which the main surface thereof faces upward, the electronic device may output the notification event in a preset display type corresponding to the notification event. For example, information of the notification event may be displayed on the main surface of the display 160 according to a preset type.

Figure 8A:
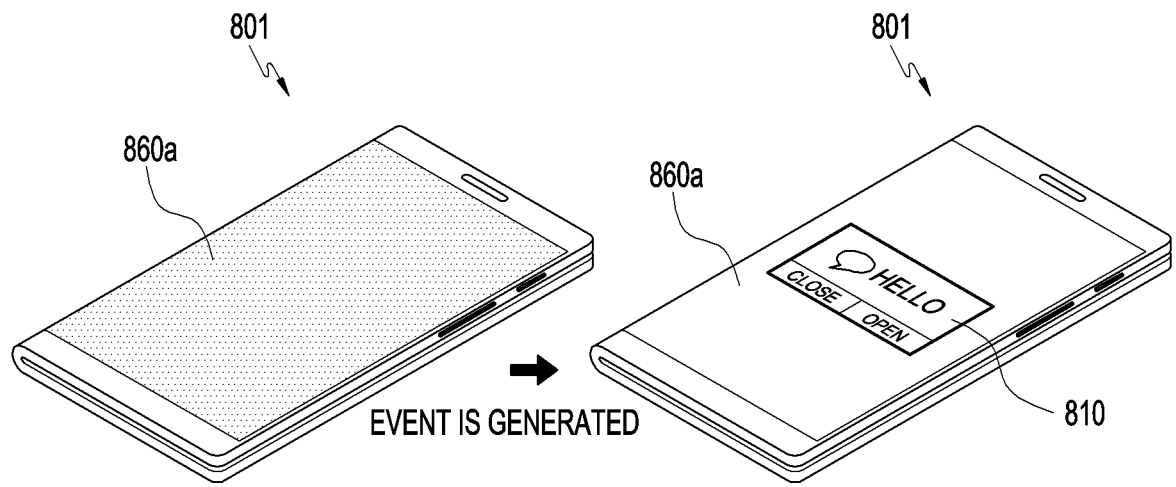
FIGS. 8A and 8B illustrate a notification event screen display according to an oriented state of the electronic device according to various embodiments.
Figure 8B:
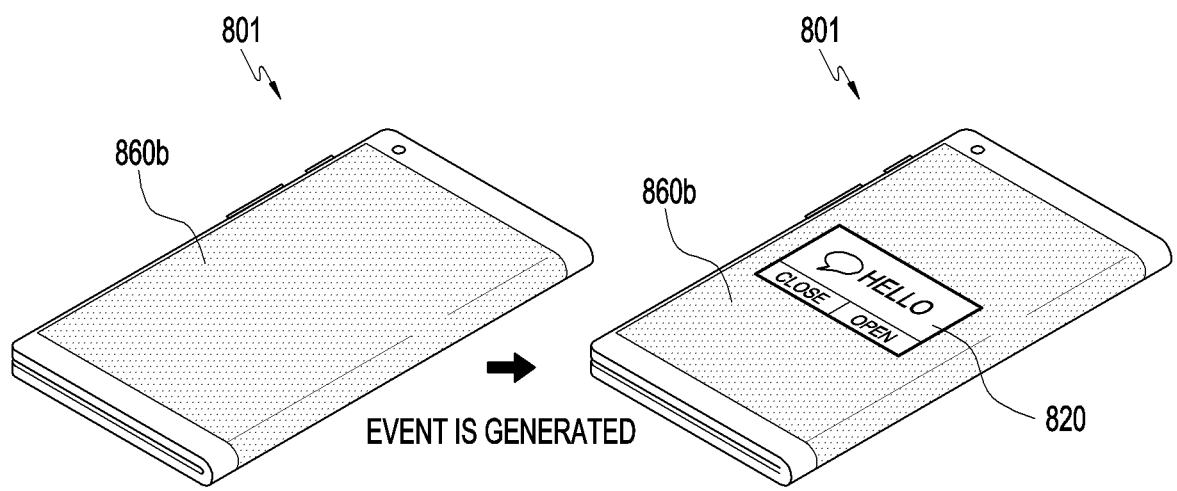

FIGS. 8A and 8B illustrate a notification event screen display according to an oriented state of the electronic device according to various embodiments.

FIG. 8A illustrates a state in which a main surface 860a of a display of an electronic device 801 in the folded state faces upward. As illustrated in FIG. 8A, when the sub-surface of the electronic device 801 faces downward or contacts a contact surface (for example, the floor or table) and an event is generated, event information 810 corresponding to generation of the event may be displayed on a main surface 860a in a preset type. At this time, when the entire display is in an off state, the sub-surface faces downward, so that a display area corresponding to the sub-surface may remain in the off state and only a display area corresponding to the main surface 860a may be turned on.

FIG. 8B illustrates a state in which the sub-surface 860b of the display of the electronic device 801 in the folded state faces upwardly. As illustrated in FIG. 8B, when the main surface of the electronic device 801 faces downward or contacts the floor and an event is generated, event information 820 corresponding to generation of the event may be displayed on the sub-surface 860b on the basis of a user setting. As illustrated in FIG. 8B, the electronic device 801 may display an always-on displayed (AOD) screen on the sub-surface 860b of the display and turn off the remaining areas other than the area of the AOD on the basis of a user setting. That is, the electronic device 801 may supply power to a light source corresponding to the area of the AOD of the display.

As described above, the user may select which surface of the electronic device 801 faces upward, thereby easily notifying only a desired notification event. For example, although FIG. 8B illustrates event information displayed with attributes (for example, the AOD) different from that of FIG. 8A, the event information of FIG. 8A and the event information of FIG. 8B may be displayed to be distinct from each other through various attributes such as size, shape, brightness, color, saturation, definition, contrast, permeability, gamma, resolution, contrast range, viewing angle, color reproduction range, color temperature, grayscale linearity, and transparency and the event information may not be displayed on the screen according to a user setting. In addition to the above description, output of the event information may be limited by reducing display brightness of the event information or restricting generation of a notification sound in a public place such as a theater or a library in which display of the event information or generation of the notification sound should be refrained.

Figure 9A:
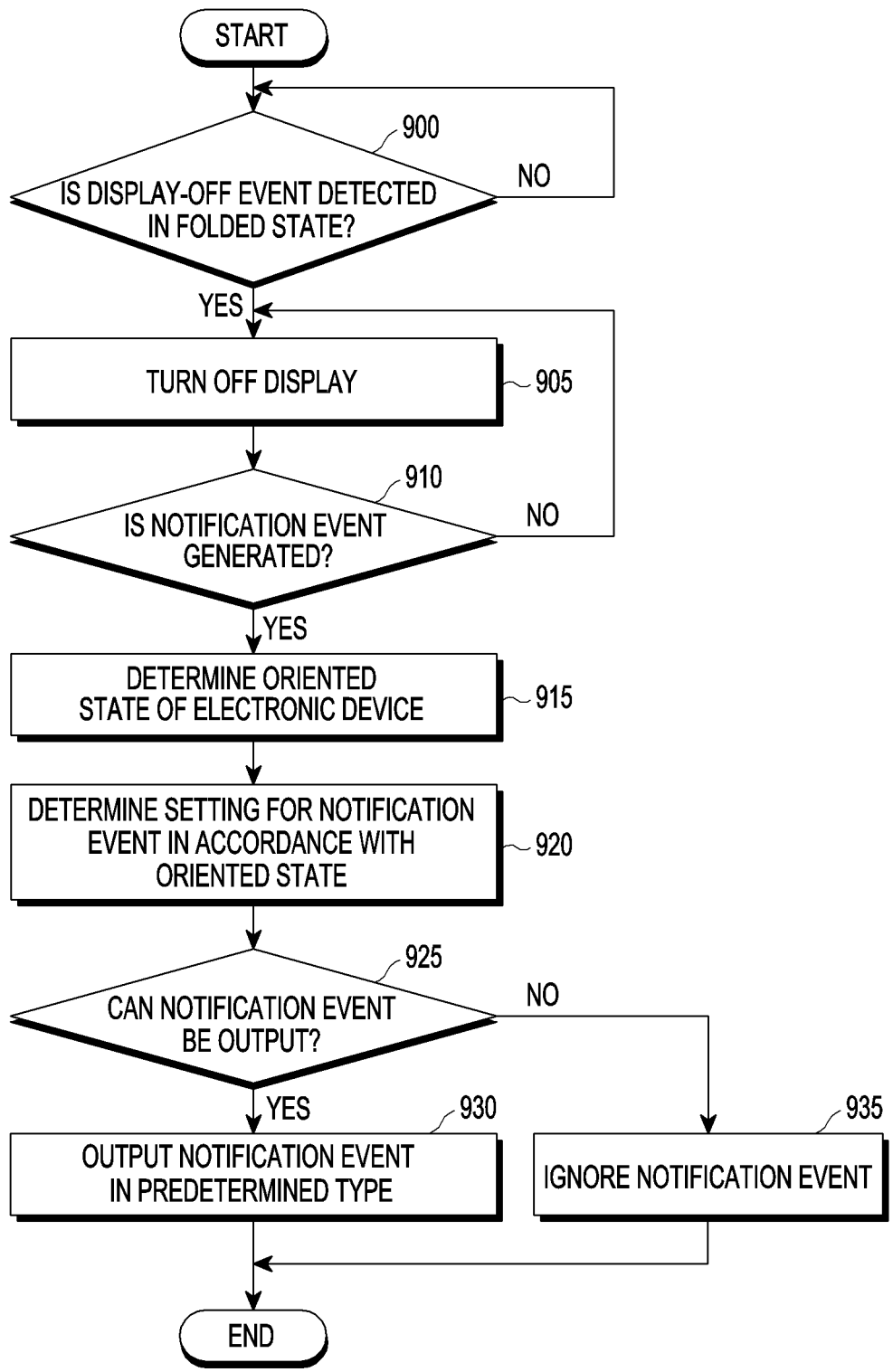
FIG. 9A is a flowchart illustrating a method of processing a notification event depending on an oriented state of an electronic device according to various embodiments.

FIG. 9A is a flowchart illustrating a method of processing a notification event depending on an oriented state of an electronic device according to various embodiments. Hereinafter, although it is described that the method of processing the notification method is performed by an electronic device (for example, the electronic device 101, 201, 301, 401, or 801), the method of processing the notification event may be performed by a processor (for example, the processor 410) of the electronic device or a controller of the electronic device.

Referring to FIG. 9A, the electronic device may determine whether a display-off event is detected in a folded state in operation 900. The display-off event may be pressing of an on/off hardware switch disposed on the electronic device or expiration of a preset screen saving setting time, but there may be no limitation thereon. For example, when the entire display is in the one state, at least a portion of the display may be controlled to be in the off state in response to the display-off event. Controlling at least the portion of the display may mean an operation in which the electronic device does not provide power to a light source corresponding to at least the portion of the display. When the display-off event is detected, the electronic device may turn off the display in operation 905.

The electronic device may determine whether a notification event is generated in operation 910. When the notification event is not generated, the electronic device may return to operation 905 and maintain the display-off state. For example, when the user attends a meeting while carrying the electronic device, the user may turn off the display by pressing a switch disposed on the electronic device and put the electronic device on a meeting table. In order to enter a private mode to prevent the meeting from being disturbed, the user may position the electronic device such that a main surface of the display of the electronic device contacts the meeting table or faces the surface of the meeting table or may position the electronic device on a holder. The user may use a function of the electronic device and then position the electronic device while not turning off the electronic device, so that operations 900 and 905 corresponding to the operations before generation of the notification event may be omitted.

When the notification event is generated, the electronic device may determine an oriented state of the electronic device in operation 915. In order to determine whether the electronic device is held or put on the floor, the electronic device may determine whether a sensor value corresponding to a state in which there is no motion is detected through at least one sensor. When it is determined that there is no motion on the basis of the sensor value, the electronic device may determine whether the oriented state of the electronic device is an oriented state in which the sub-surface faces upward or an oriented state in which the main surface faces upward.

In operation 920, the electronic device may determine settings for the notification event in accordance with the oriented state of the electronic device. In operation 925, the electronic device may determine whether the notification event is a notification event which can be output. For example, it may be determined whether an application for which the notification event is generated is activated to output the event in a private notification mode. When the notification event is a notification event which can be output, for example, when the notification event is a notification event for the application activated to output the notification event, the electronic device may output the notification event in a preset type in operation 930.

When the notification event is not a notification event which can be output, for example, when the notification event is a notification event for an application configured to be deactivated, the electronic device may ignore the notification event in operation 935. Accordingly, the output of the notification event may be omitted. For example, when the oriented state of the electronic device in the folded state is an oriented state in which the main surface faces upward, the electronic device may output event information on the main surface. On the other hand, when the oriented state is an oriented state in which the sub-surface faces upward, the electronic device may output event information on the sub-surface or omit the output of the event information according to a user setting.

As described above, when the notification event is generated in the folded state and the notification event can be output, the electronic device may output the event information in a preset type such as displaying the event information on the sub-surface. Although the case in which the output type of the event information is determined on the basis of the oriented state of the electronic device has been described by way of an example, the output type of the event information may be determined taking account of conditions around the electronic device, which will be described in detail with reference to FIG. 9B.

Figure 9B:
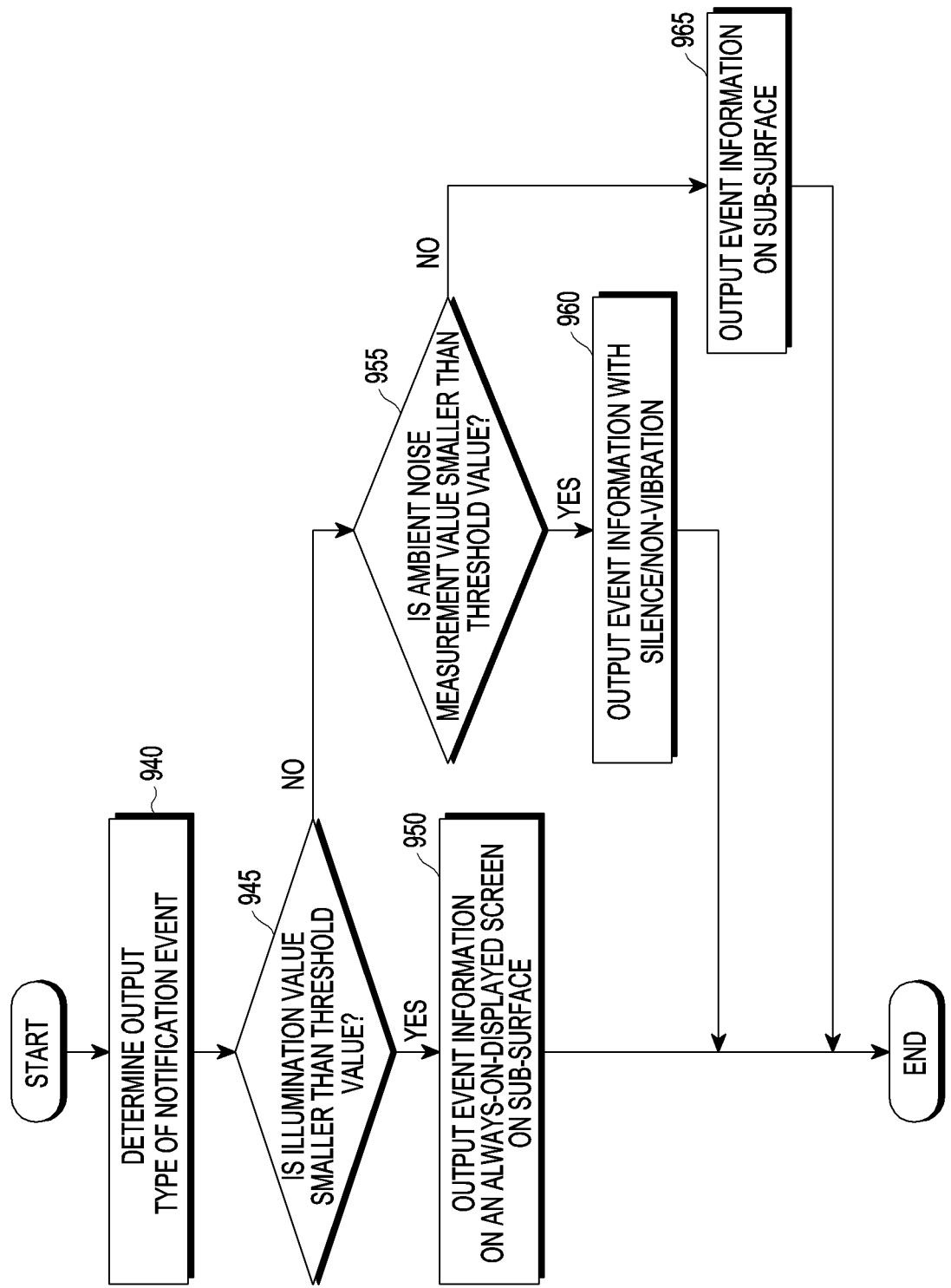
FIG. 9B is a flowchart illustrating a detailed method of processing a notification event by an electronic device according to various embodiments.

FIG. 9B is a flowchart illustrating a detailed method of processing a notification event by an electronic device according to various embodiments.

Referring to FIG. 9B, the electronic device in the folded state may determine an output type of a notification event in accordance with an oriented state in which the sub-surface faces upward in operation 940. To this end, the electronic device may determine whether an illumination value detected using an illumination sensor among at least one sensor of the electronic device is smaller than a threshold value in operation 945. When the detected illumination value is smaller than the threshold value, it means that it is dark around the electronic device, so that the electronic device may determine that the situation needs a manner-mode notification as in a meeting room, a theater, etc. and output event information corresponding to the generated notification event on the sub-surface in an always-on displayed type in operation 950. For example, the electronic device may output information of the notification event by turning on only an area of the always-on-displayed screen so as not to disturb others as much as possible or through a display type of darkening a background color of the always-on display or reducing background brightness.

Further, in operation 955, the electronic device may measure ambient noise based on an ambient sound received through at least one microphone of the electronic device and compare the ambient noise measurement value with a threshold value to determine whether the ambient noise measurement value is smaller than the threshold value. When the ambient noise measurement value is smaller than the threshold value, the electronic device may determine that the manner-mode notification is needed and output event information with silence/non-vibration in operation 960.

When the measured illumination value is not smaller than the threshold value and the ambient noise measurement value is not smaller than the threshold value, the electronic device may output event information on the sub-surface in operation 965. At this time, when the electronic device is set in the vibration mode, event information may be displayed on the sub-surface along with vibration.

As described above, according to which surface between the main surface and the sub-surface is positioned downward by the user after the user folds the electronic device, whether to activate the private notification mode may be easily selected. For example, when the user positions the electronic device such that the sub-surface thereof is exposed to the user, the private notification mode may be activated and only a notification event for an application configured by the user may be output. At this time, when the notification event is output, only the notification event for the application activated by the user may be displayed on the sub-surface, and only partial areas of the sub-surface may be turned on and event information may be displayed thereon in order to indicate the private notification mode. Further, when the user visits a theater or attends a meeting, the electronic device may recognize that output of the event is restricted now by measuring ambient noise or on the basis of the current location and process information of the notification event with silence as in the mute mode.

As described above, according to the oriented state of the electronic device in the folded state, the notification event corresponding to the application deactivated through the private notification setting may be ignored and only the notification event corresponding to the activated application may be identified, which increases convenience of the use.

Figure 10A:
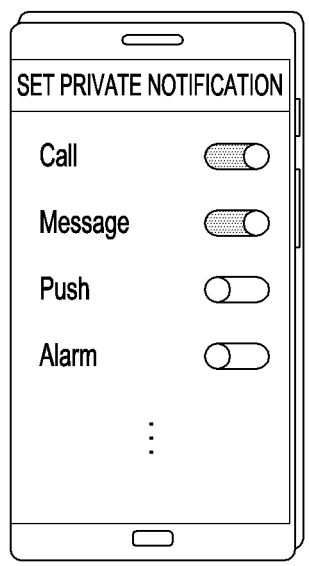
FIGS. 10A and 10B illustrate a method of setting a private notification according to various embodiments.
Figure 10B:
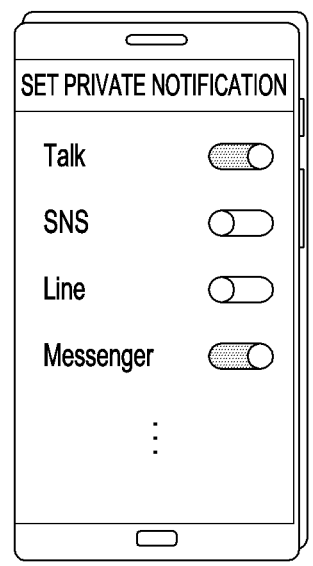

FIGS. 10A and 10B illustrate a method of setting a private notification according to various embodiments and show a screen for setting a private notification.

Referring to FIGS. 10A and 10B, the user may perform selection to receive only a notification of a desired event in a private notification mode. As illustrated in FIGS. 10A and 10B, the user may set whether to provide a notification of a desired application. The private notification mode according to the user setting may correspond to a mode supporting whether to output event information on the sub-surface without output of event information on the main surface of the display. In the private notification mode, the operation of outputting event information may be limited like in the vibration mode or the mute mode, and accordingly sound output or vibration output may be omitted.

In the folded state, with respect to the default mode in which the main surface of the display of the electronic device faces upward and the private notification mode in which the sub-surface of the display of the electronic device faces upward, graphic elements displayed on the main surface and graphic elements displayed on the sub-surface may be different from each other to represent the corresponding mode. For example, background color/background brightness and font/font color/font size with which the information of the notification event is displayed may be different, and also all graphic elements for identifying the private notification mode may be included.

As illustrated in FIG. 10A, the user may select whether to activate or deactivate event notifications for a plurality of applications of which the notification is to be provided on the sub-surface. Further, as illustrated in FIG. 10B, the user may select whether to activate or deactivate event notifications for a plurality of SNS applications of which the notification is to be provided on the sub-surface.

Applications of which notification event outputs can be set to be activated or deactivated may include all applications which can provide a notification event, for example, a call application, an SMS/MMS application, an Instant Message (IM) application, a push message application, an alarm application, an e-mail application, a calendar application, a health care application (for example, measuring quantity of exercise or blood sugar), or an application for providing environmental information (for example, air pressure, humidity, or temperature information).

According to an embodiment, applications which can provide notification information may include an information exchange application which may support an information exchange between an electronic device and an external electronic device. The information exchange application may include, for example, a notification relay application for relaying particular information to an external electronic device or a device management application for managing an external electronic device. For example, the notification relay application may relay notification information generated in the other applications of the electronic device to an external electronic device, or may receive notification information from an external electronic device to provide the received notification information to a user. The device management application may install, delete, or update, for example, a function of an external electronic device communicating with the electronic device (for example, a function of turning on/off the external electronic device itself (or some elements) or controlling brightness (or resolution) of the display) or an application executed in the external electronic device.

According to an embodiment, applications which can provide notification information may include a predetermined application (for example, a health management application of a mobile medical device) according to attributes of the external electronic device. According to an embodiment, applications which can provide notification information may include an application received from the external electronic device.

As described above, for the private notification mode, whether to output event information for each of a plurality of applications may be preset and then whether to enter the private notification mode may be easily selected according to the oriented state of the electronic device in user context. For example, the user may activate the private notification mode by putting the electronic device such that the main surface of the display faces downward. Conventionally, in order to change whether to output a notification of each application, the user should enter a setting screen for each application and change the settings every time, but according to various embodiments, the user can set activation or deactivation of notifications of desired applications in advance at a time through a private notification setting screen. When the user desires to execute items set through the private notification setting screen, the user may easily determine activation of the private notification mode according to the oriented state of the electronic device.

Figures 11A, 11B, 11C:
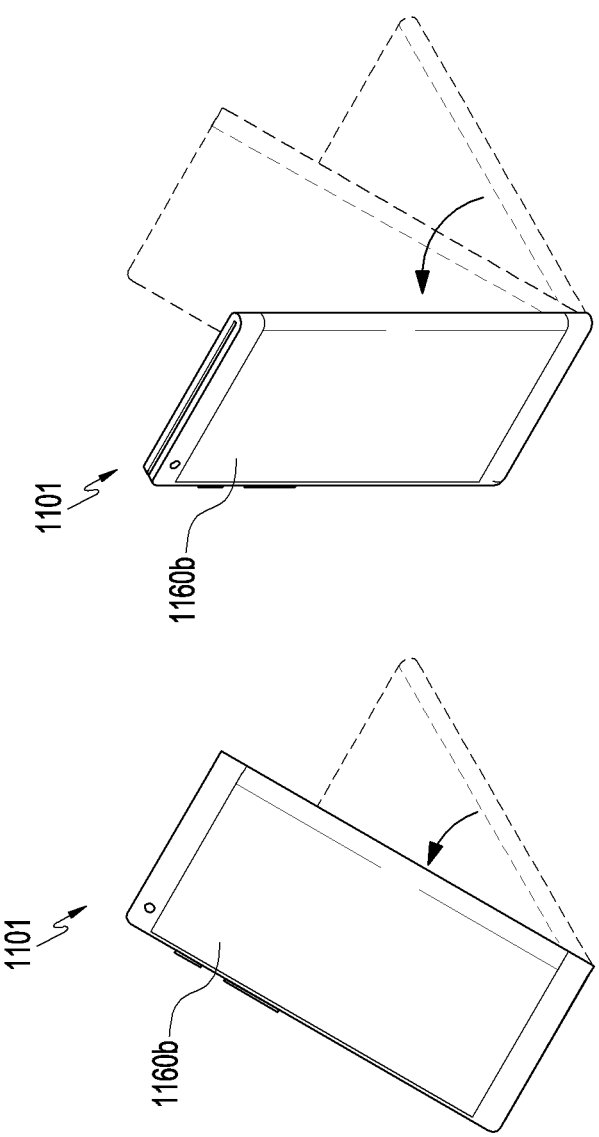
FIGS. 11A, 11B, and 11C are perspective views illustrating oriented states of the electronic device depending on tilting angles according to various embodiments.

FIGS. 11A to 11C are perspective views illustrating oriented states of the electronic device depending on tilting angles according to various embodiments.

FIG. 11A illustrates an oriented state in which an electronic device 110 is positioned in a folded state such that a sub-surface 1160*b* of a display faces upward. In FIG. 11B, the electronic device 1101 is positioned in the folded state such that the sub-surface 1160*b* of the display faces upward similar to FIG. 11A, but the sub-surface 1160*b* is tilted at a predetermined angle while facing upward without contact between a main surface of the display and the floor. FIG. 11C illustrates the case in which the electronic device 1101 is positioned in the folded state such that the sub-surface 1160*b* of the display faces a front direction or a user direction and the main surface faces a direction opposite the user.

As illustrated in FIGS. 11A to 11C, the sub-surface 1160*b* of the electronic device 1101 in the folded state faces the front direction, the upward direction, or the user direction, but tilting angles at which the electronic device 1101 is positioned may be different. Accordingly, even though the tilting angles are different, the private notification mode may be activated in accordance with the oriented state in which the sub-surface 1160*b* of the electronic device 1101 is positioned to be exposed to the user. However, the display type of event information may be variously defined according to the tilting angle, which will be described in detail with reference to FIG. 12.

Figure 12:
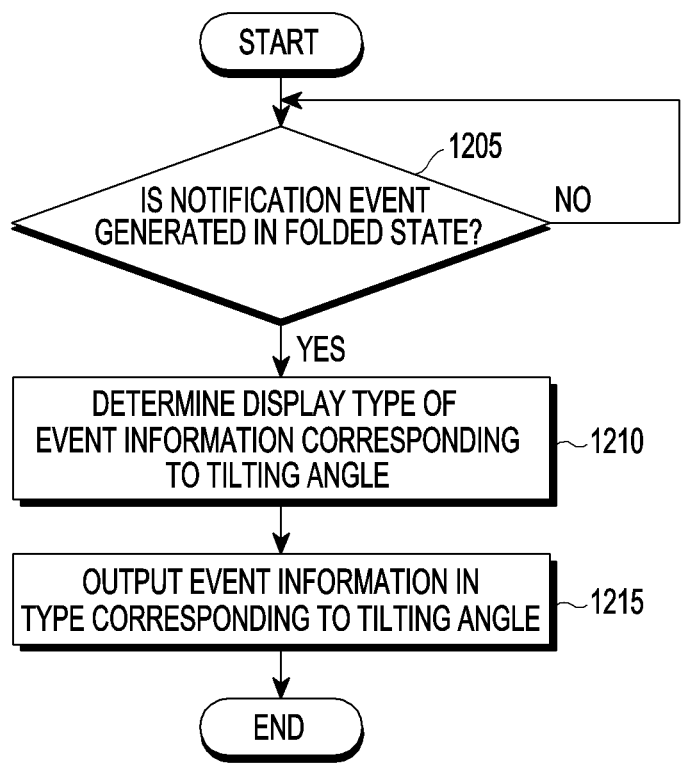
FIG. 12 is a flowchart illustrating a method of determining a display type of event information corresponding to a tilting angle of the electronic device according to various embodiments.

FIG. 12 is a flowchart illustrating a method of determining a display type of event information corresponding to a tilting angle of the electronic device according to various embodiments. Hereinafter, although it is described that the method of determining the display type of event information is performed by an electronic device (for example, the electronic device 101, 201, 301, 401, or 801), the method may be performed by a processor (for example, the processor 410) of the electronic device of a controller of the electronic device.

Referring to FIG. 12, the electronic device may determine whether a notification event is generated in a folded state in operation 1205. At this time, the electronic device may be in an oriented state in which a main surface thereof faces downward or a direction opposite the user. The folded state may be a state in which both ends of the display of the electronic device are completely folded but include a folded state such as a compact type. For example, the user may fold the electronic device and then position the electronic device on the floor, but may position the electronic device on a holder or stand the electronic device. In operation 1210, the electronic device may determine a display type of event information corresponding to a tilting angle. In operation 1215, the electronic device may output event information in the type corresponding to the tilting angle.

FIGS. 13A to 13C illustrate screens for displaying event information corresponding to tilting angles of the electronic device according to various embodiments.

As illustrated in FIG. 13A, when an electronic device 1301 is positioned on the floor in a folded state, the electronic device 1301 may display event information on a sub-surface 1360*b* in a first display type 1305. As illustrated in FIG. 13B, when the electronic device 1301 is positioned in the folded state such that the electronic device 1301 is tilted from the floor at a predetermined angle, the electronic device 1301 may display event information on the sub-surface 1360*b* in a second display type 1310. As illustrated in FIG. 13C, when the electronic device 1301 is positioned in the folded state such that the electronic device is tilted from the floor at a predetermined angle larger than that of FIG. 13B, the electronic device 1301 may display event information on the sub-surface 1360*b* in a third display type 1315. Although FIGS. 13A to 13C illustrate the case in which the size of graphic elements and the font size of event information are differently output in different display types, various graphic elements related to event information including brightness, icon, and text may be used and are not limited thereto.

Meanwhile, when the user desires to identify displayed event information, the user may identify detailed content corresponding to the event information by making an unfolded/motion input for unfolding the electronic device, making a voice input, or selecting a software button (or a toggle button) displayed on the display.

The term "module" as used herein may include a unit consisting of hardware, software, or firmware, and may, for example, be used interchangeably with the term "logic", "logical block", "component", "circuit", or the like. The "module" may be an integrated component or a minimum unit for performing one or more functions or a part thereof. The "module" may be mechanically or electronically implemented, and may include, for example, an Application-Specific Integrated Circuit (ASIC) chip, a Field-Programmable Gate Array (FPGA), or a programmable logic device, which is currently known or is to be developed in the future, for performing certain operations.

At least some of devices (for example, modules or functions thereof) or methods (for example, operations) according to various embodiments may be implemented by instructions stored in a computer-readable storage medium (for example, the memory 430) in the form of a program module. When the instructions are executed by a processor (for example, the processor 410), the processor may perform a function corresponding to the instructions. The computer-readable storage medium may include a hard disk, a floppy disk, magnetic media (for example, a magnetic tape), optical media (for example, CD-ROM and DVD), magneto-optical media (for example, a floptical disk), an internal memory, and the like. The instructions may include code made by a compiler or code that can be executed by an interpreter.

The programming module according to the disclosure may include one or more of the aforementioned components or may further include other additional components, or some of the aforementioned components may be omitted. Operations performed by a module, a programming module, or other elements according to various embodiments may be executed sequentially, in parallel, repeatedly, or in a heuristic manner. At least some operations may be executed according to another sequence, may be omitted, or may further include other operations.

According to various embodiments, a storage medium storing instructions is provided. The instructions may be configured to cause at least one processor to, when executed by the at least one processor, perform at least one operation. The at least one operation may include an operation of detecting a notification event in a folded state in which a flexible display is divided into a first area and a second area, an operation of processing a notification event in a first type using at least one of the first area and the second area when the electronic device is in a first oriented state, and an operation of processing the notification event in a second type using at least one of the first area and the second area when the electronic device is in a second oriented state.

Various embodiments disclosed herein are provided merely to easily describe technical details of the disclosure and to help the understanding of the disclosure, and are not intended to limit the scope of the disclosure. Accordingly, the scope of the disclosure should be construed as including all modifications or various other embodiments based on the technical idea of the disclosure.

The invention claimed is:

1. An electronic device comprising:
 a flexible display; and
 a processor configured to:
  identify whether a notification event is generated in a folded state in which the flexible display is divided into a first area and a second area, the notification event being reception of a call, a message, or alarm;
  in response to the notification event being generated in the folded state, identify whether an oriented state of the electronic device is a first oriented state or a second oriented state in which the first area of the display faces downward;
  in response to the oriented state of the electronic device being the first oriented state, perform control to display information of the notification event using the first area; and
  in response to the oriented state of the electronic device being the second oriented state in which the first area of the display faces downward, identify whether the notification event corresponds to an application set to allow an output of the notification event in a private notification mode,
  in response to identifying the notification event as corresponding to the application set to allow the output of the notification event in the private notification mode, identify whether an illumination value detected using an illumination sensor is smaller than a threshold value, and
  in response to the detected illumination value being smaller than the threshold value, activate the private notification mode and perform control to display the information of the notification event using the second area in an always-on displayed type, wherein, in response to the electronic device being in the second oriented state and the notification event corresponding to an application set not to allow an output of the notification event in the private notification mode, the information of the notification event is not displayed.

2. The electronic device of claim 1, wherein the first oriented state corresponds to an oriented state in which the first area faces a first direction and the second area faces a second direction opposite the first direction, and the second oriented state corresponds to an oriented state in which the first area faces downward and the second area faces upward.

3. The electronic device of claim 1, wherein, when the information of the notification event is displayed in the second area, the processor is configured to control the first area to be in an off state and the second area to be in an on state.

4. The electronic device of claim 1, further comprising a memory configured to store information for setting whether to allow an output of the notification event for each of at least one application.

5. The electronic device of claim 4, wherein, when the electronic device is in the second oriented state, the processor is configured to identify whether the notification event can be output using the information stored in the memory.

6. The electronic device of claim 1, further comprising:
a first sensor configured to detect the folded state of the display; and
a second sensor configured to detect the oriented state of the electronic device.

7. A method of controlling a display by an electronic device, the method comprising:
identifying whether a notification event is generated in a folded state in which a flexible display is divided into a first area and a second area, the notification event being reception of a call, a message, or an alarm;
in response to identifying the notification event being generated in the folded state, identifying whether an oriented state of the electronic device is a first oriented state or a second oriented state in which the first area of the display faces downward;
in response to the oriented state of the electronic device being the first oriented state, displaying information of the notification event using the first area;
in response to the oriented state of the electronic device being the second oriented state in which the first area of the display faces downward, identifying whether the notification event corresponds to an application set to allow an output of the notification event in a private notification mode;
in response to identifying the notification event as corresponding to the application set to allow the output of the notification event in the private notification mode, identifying whether an illumination value detected using an illumination sensor is smaller than a threshold value; and in response to the detected illumination value being smaller than the threshold value, activating the private notification mode and displaying the information of the notification event using the second area in an always-on displayed type, wherein, in response to the electronic device being in the second oriented state and the notification event corresponding to and application set not to allow an output of the notification event in the private notification mode, the information of the notification event is not displayed.

8. The method of claim 7, wherein the controlling the flexible display to display the information of the notification event in the second area comprises controlling the first area to be in an off state and the second area to be in an on state.

9. A non-transitory storage medium storing instructions, the instructions being configured to cause at least one processor to, when executed by the at least one processor, perform at least one operation, the at least one operation comprising:
identifying whether a notification event is generated in a folded state in which a flexible display is divided into a first area and a second area, the notification event being reception of a call, a message, or an alarm;
in response to identifying the notification event being generated in the folded state, identifying whether an oriented state of the electronic device is a first oriented state or a second oriented state in which the first area of the display faces downward;
in response to the oriented states of the electronic device being the first oriented state, displaying information of the notification event using the first area;
in response to the oriented state of the electronic device being the second oriented state in which the first area of the display faces downward, identifying whether the notification event corresponds to an application set to allow an output of the notification event in a private notification mode;
in response to identifying the notification event as corresponding to the application set to allow the output of the notification event in the private notification mode, identifying whether an illumination value detected using an illumination sensor is smaller than a threshold value; and
in response to the detected illumination value being smaller than the threshold value, activating the private notification mode and displaying the information of the notification event using the second area in an always-on displayed type, wherein, in response to the electronic device being in the second oriented state and the notification event corresponds to an application set not to allow an output of the notification event in the private notification mode, the information of the notification event is not displayed.

* * * * *